US012804055B2

(12) United States Patent
Maharana et al.

(10) Patent No.: US 12,804,055 B2
(45) **Date of Patent: *Nov. 17, 2026**

(54) OPTIMIZATION OF DATA ACCESS AND COMMUNICATION IN MEMORY SYSTEMS

(71) Applicant: Micron Technology, Inc., Boise, ID (US)

(72) Inventors: Parag R. Maharana, Dublin, CA (US); Anirban Ray, Santa Clara, CA (US); Gurpreet Anand, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/351,991

(22) Filed: Jul. 13, 2023

(65) Prior Publication Data

US 2023/0362280 A1 Nov. 9, 2023

Related U.S. Application Data

(60) Division of application No. 17/135,774, filed on Dec. 28, 2020, now Pat. No. 11,706,317, which is a
(Continued)

(51) Int. Cl.
*H04L 67/63* (2022.01)
*G06F 9/455* (2018.01)
(Continued)

(52) U.S. Cl.
CPC .......... *H04L 67/63* (2022.05); *G06F 9/45558* (2013.01); *G06F 12/0246* (2013.01); *H04L 67/1097* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,390,334 | A | 2/1995 | Harrison |
| 5,727,150 | A | 3/1998 | Laudon et al. |

(Continued)

FOREIGN PATENT DOCUMENTS

| | | | |
|---|---|---|---|
| CN | 104391803 | | 3/2015 |
| KR | 20160116533 | A | 10/2016 |

OTHER PUBLICATIONS

"Solid-State Drive", Wikipedia, printed on Mar. 14, 2018.

(Continued)

*Primary Examiner* — Backhean Tiv
(74) *Attorney, Agent, or Firm* — Greenberg Traurig

(57) ABSTRACT

A memory system having one or more memory components and a controller. The controller can receive access requests from a communication connection. The access requests can identify data items associated with the access requests, addresses of the data items, and contexts of the data items in which the data items are used for the access requests. The controller can identify separate memory regions for separate contexts respectively, determine placements of the data items in the separate memory regions based on the contexts of the data items, and determine a mapping between the addresses of the data items and memory locations that are within the separate memory regions corresponding to the contexts of the data items. The memory system stores the data items at the memory locations separated by different memory regions according to different contexts.

20 Claims, 9 Drawing Sheets

Related U.S. Application Data continuation of application No. 16/183,234, filed on Nov. 7, 2018, now Pat. No. 10,880,401.

(60) Provisional application No. 62/629,628, filed on Feb. 12, 2018.

(51) Int. Cl.
*G06F 12/02* (2006.01)
*H04L 67/1097* (2022.01)

(56) References Cited

U.S. PATENT DOCUMENTS 5,909,540 A * 6/1999 Carter ................ G06F 11/0724 711/E12.066
5,918,229 A * 6/1999 Davis .................. G06F 11/0724 711/E12.066
6,026,475 A * 2/2000 Woodman ............... G06F 12/10 711/E12.063
6,230,260 B1 5/2001 Luick
6,247,097 B1 6/2001 Sinharoy
6,247,101 B1 * 6/2001 Settles .................. G06F 13/362 711/158
6,279,138 B1 8/2001 Jadav et al.
6,321,233 B1 * 11/2001 Larson ...................... G06F 3/14
6,473,845 B1 * 10/2002 Hornung ............. G06F 12/0292 711/202
7,149,857 B2 * 12/2006 Jeddeloh ............. G06F 13/1626 711/2
7,376,681 B1 * 5/2008 Todd ....................... G06F 16/10
8,082,400 B1 12/2011 Chang et al.
8,117,373 B2 2/2012 Berlin
8,131,814 B1 3/2012 Schlansker et al.
8,135,933 B2 3/2012 Fisher et al.
8,316,187 B2 11/2012 Pothireddy
8,352,709 B1 1/2013 Glasco et al.
8,560,761 B2 10/2013 Tzeng
8,700,724 B2 4/2014 McDaniel et al.
8,825,937 B2 * 9/2014 Atkisson ............. G06F 12/0895 711/E12.041
8,838,887 B1 * 9/2014 Burke ................... G06F 3/0611 711/112
8,868,842 B2 10/2014 Yano et al.
8,930,647 B1 1/2015 Smith
8,965,819 B2 2/2015 Tirunagari
8,996,834 B2 3/2015 Brenner et al.
9,342,453 B2 5/2016 Nale et al.
9,619,408 B2 4/2017 Nale et al.
9,666,244 B2 * 5/2017 Hyun ..................... G11C 16/16
9,697,130 B2 * 7/2017 Karippara ................. G06F 9/50
9,817,739 B1 * 11/2017 Pise .................... G06F 11/1458
9,910,618 B1 3/2018 Curley et al.
10,120,797 B1 * 11/2018 Foley .................... G06F 12/109
10,223,371 B2 * 3/2019 Thirumal ............ G06F 16/1748
10,241,943 B2 3/2019 Nale et al.
10,270,855 B2 * 4/2019 Palthepu ............... G06F 16/182
10,282,322 B2 5/2019 Nale et al.
10,282,323 B2 5/2019 Nale et al.
10,289,566 B1 5/2019 Dalmatov et al.
10,298,496 B1 * 5/2019 Nakibly .............. G06F 12/0802
10,339,056 B2 * 7/2019 Joshi ................... G06F 12/0842
10,394,789 B1 * 8/2019 Animesh ............. G06F 16/2282
10,430,723 B1 10/2019 Tzur et al.
10,514,855 B2 * 12/2019 Voigt .................. H04L 67/1097
10,656,841 B1 * 5/2020 Huang .................... G06F 3/061
10,782,908 B2 9/2020 Mittal et al.
10,852,949 B2 12/2020 Frolikov et al.
10,880,401 B2 * 12/2020 Maharana ........... G06F 12/1072
11,706,317 B2 * 7/2023 Maharana ........... G06F 9/45558 709/217
2002/0145919 A1 * 10/2002 Lamb ............... G11C 29/50008 365/189.09
2002/0196659 A1 12/2002 Hurst et al.
2003/0126232 A1 * 7/2003 Mogul ................ G06F 16/9574 709/219
2004/0186960 A1 * 9/2004 Poggio .................. G06F 9/3802 712/E9.055
2005/0172055 A1 * 8/2005 Ho ...................... G06F 13/4027 710/52
2006/0087893 A1 4/2006 Nishihara et al.
2006/0095679 A1 5/2006 Edirisooriya
2006/0206658 A1 9/2006 Hendel et al.
2007/0033367 A1 2/2007 Sakarda et al.
2007/0112864 A1 * 5/2007 Ben-Natan .......... G06F 16/2358
2008/0005479 A1 * 1/2008 Tremaine ............ G06F 13/1673 711/137
2008/0016297 A1 * 1/2008 Bartley ................... G06F 12/08 711/159
2008/0215826 A1 9/2008 Markova et al.
2009/0113422 A1 4/2009 Kani
2009/0150639 A1 6/2009 Ohata
2010/0011169 A1 1/2010 Pothireddy
2010/0017632 A1 1/2010 Cooper et al.
2010/0082899 A1 4/2010 Nakajima et al.
2010/0281230 A1 11/2010 Rabii et al.
2010/0293412 A1 11/2010 Sakaguchi et al.
2011/0161554 A1 6/2011 Selinger et al.
2011/0231857 A1 9/2011 Zaroo et al.
2011/0238887 A1 9/2011 Bazzani
2011/0238899 A1 9/2011 Yano et al.
2012/0047312 A1 2/2012 Nathuji et al.
2012/0054419 A1 * 3/2012 Chen ................... G06F 12/0246 711/E12.008
2012/0079285 A1 3/2012 Gueron et al.
2012/0084497 A1 4/2012 Subramaniam et al.
2012/0117304 A1 * 5/2012 Worthington ....... G06F 11/3037 711/170
2012/0166582 A1 * 6/2012 Binder .................. G06F 21/602 709/217
2012/0323977 A1 12/2012 Fortier et al.
2013/0111113 A1 5/2013 Harari et al.
2013/0145095 A1 6/2013 McKean et al.
2013/0151761 A1 * 6/2013 Kim ........................ G06F 21/78 711/E12.008
2013/0152086 A1 6/2013 Yoo et al.
2013/0226837 A1 * 8/2013 Lymberopoulos .......................... G06F 16/9574 706/12
2014/0006740 A1 1/2014 Tokusho et al.
2014/0032818 A1 1/2014 Chang et al.
2014/0040550 A1 2/2014 Bill et al.
2014/0089631 A1 3/2014 King
2014/0281311 A1 9/2014 Walker et al.
2014/0310470 A1 * 10/2014 Rash ................... G06F 12/0862 711/126
2015/0026509 A1 1/2015 Zhang et al.
2015/0032921 A1 1/2015 Malkin
2015/0067087 A1 3/2015 Guerin et al.
2015/0082062 A1 3/2015 Saraswat et al.
2015/0097851 A1 * 4/2015 Anderson ................. G06T 1/60 345/552
2015/0106656 A1 4/2015 Bian et al.
2015/0134927 A1 * 5/2015 Varanasi ............... G06F 3/0638 711/170
2015/0160858 A1 6/2015 Okada et al.
2015/0169238 A1 6/2015 Lee et al.
2015/0178013 A1 6/2015 Rostoker et al.
2015/0199276 A1 * 7/2015 Radhakrishnan ... G06F 12/0862 711/137
2015/0212741 A1 7/2015 Lee et al.
2015/0227465 A1 8/2015 Sundaram et al.
2015/0268875 A1 9/2015 Jeddeloh
2015/0278091 A1 10/2015 Wilkerson et al.
2015/0356125 A1 12/2015 Golander et al.
2015/0378934 A1 12/2015 Nathan et al.
2015/0380097 A1 * 12/2015 Sato ....................... G11C 16/26 365/185.12
2016/0054922 A1 * 2/2016 Awasthi ................ G06F 3/0685 711/170
2016/0125048 A1 * 5/2016 Hamada ............ G06F 16/24578 707/734

(56) References Cited

U.S. PATENT DOCUMENTS

| | | | | |
|---|---|---|---|---|
| 2016/0188218 | A1* | 6/2016 | Gray | G06F 11/20 711/165 |
| 2016/0188700 | A1 | 6/2016 | Kleinschnitz, Jr et al. | |
| 2016/0210167 | A1 | 7/2016 | Bolic et al. | |
| 2016/0210251 | A1 | 7/2016 | Nale et al. | |
| 2016/0210465 | A1* | 7/2016 | Craske | G06F 21/629 |
| 2016/0212214 | A1 | 7/2016 | Rahman et al. | |
| 2016/0253263 | A1 | 9/2016 | Takada | |
| 2016/0283698 | A1 | 9/2016 | Huang et al. | |
| 2016/0294710 | A1* | 10/2016 | Sreeramoju | H04L 47/2441 |
| 2016/0306557 | A1 | 10/2016 | Koseki et al. | |
| 2016/0328334 | A1 | 11/2016 | Mese et al. | |
| 2016/0350236 | A1 | 12/2016 | Tsirkin et al. | |
| 2017/0026323 | A1* | 1/2017 | Bolshinsky | G06Q 10/101 |
| 2017/0039164 | A1 | 2/2017 | Ioannou et al. | |
| 2017/0060754 | A1 | 3/2017 | Nakra et al. | |
| 2017/0123796 | A1 | 5/2017 | Kumar et al. | |
| 2017/0131902 | A1 | 5/2017 | Goss et al. | |
| 2017/0147427 | A1* | 5/2017 | Nero | G05B 19/0425 |
| 2017/0177486 | A1 | 6/2017 | Horn | |
| 2017/0249266 | A1 | 8/2017 | Nale et al. | |
| 2017/0255383 | A1 | 9/2017 | Chang et al. | |
| 2017/0262215 | A1 | 9/2017 | Banerjee et al. | |
| 2017/0285992 | A1 | 10/2017 | Vogt | |
| 2017/0302734 | A1* | 10/2017 | Liang | H04L 67/1097 |
| 2017/0315735 | A1* | 11/2017 | Leggette | G06F 9/5088 |
| 2017/0316321 | A1* | 11/2017 | Whitney | G06F 16/9574 |
| 2017/0364422 | A1 | 12/2017 | Antony et al. | |
| 2017/0364450 | A1 | 12/2017 | Struttmann | |
| 2018/0001790 | A1 | 1/2018 | Erbacher et al. | |
| 2018/0011790 | A1* | 1/2018 | Gaur | G06F 12/0897 |
| 2018/0024853 | A1* | 1/2018 | Warfield | G06F 9/45558 718/1 |
| 2018/0046581 | A1 | 2/2018 | Banerjee et al. | |
| 2018/0089087 | A1 | 3/2018 | Chang et al. | |
| 2018/0121366 | A1* | 5/2018 | Tian | G06F 9/45558 |
| 2018/0150219 | A1 | 5/2018 | Chen et al. | |
| 2018/0189207 | A1 | 7/2018 | Nale et al. | |
| 2018/0293163 | A1* | 10/2018 | Bergeron | G06F 12/023 |
| 2018/0316569 | A1* | 11/2018 | Cilfone | G06F 11/008 |
| 2019/0004841 | A1* | 1/2019 | Starks | G06F 9/5016 |
| 2019/0018809 | A1 | 1/2019 | Nale et al. | |
| 2019/0079689 | A1 | 3/2019 | Cherubini et al. | |
| 2019/0129847 | A1* | 5/2019 | Roh | G06F 3/0604 |
| 2019/0179760 | A1* | 6/2019 | Bhargava | G06F 12/0895 |
| 2019/0196996 | A1* | 6/2019 | Balakrishnan | G06F 13/30 |
| 2019/0243552 | A1 | 8/2019 | Maharana et al. | |
| 2019/0243570 | A1 | 8/2019 | Mittal et al. | |
| 2019/0243756 | A1 | 8/2019 | Ray et al. | |
| 2019/0243771 | A1 | 8/2019 | Mittal et al. | |
| 2019/0243787 | A1 | 8/2019 | Mittal et al. | |
| 2019/0253520 | A1* | 8/2019 | Maharana | G06N 3/092 |
| 2019/0332556 | A1 | 10/2019 | Nale et al. | |
| 2020/0019506 | A1 | 1/2020 | Ray et al. | |
| 2020/0073827 | A1* | 3/2020 | Wallach | G06F 12/1458 |
| 2020/0074094 | A1* | 3/2020 | Wallach | G06F 21/629 |
| 2020/0319813 | A1 | 10/2020 | Mittal et al. | |
| 2020/0326851 | A1 | 10/2020 | Frolikov et al. | |
| 2021/0120099 | A1* | 4/2021 | Maharana | H04L 67/1097 |
| 2023/0362280 | A1* | 11/2023 | Maharana | G06F 12/0868 |

OTHER PUBLICATIONS

"Write combining," Wikipedia encyclopedia entry located at https://en.wikipedia.org/wiki/Write_combining, Feb. 12, 2018.

A. Romanow, J. Mogul, T. Talpey, S. Bailey, "Remote Direct Memory Access (RDMA) over IP Problem Statement", RFC 4297, Dec. 2005 (https://www.rfc-editor.org/search/rfc_search_detail.php).

Cai, "Error Characterization, Mitigation and Recovery", 2017.

Demand paging, Wikipedia, printed on Apr. 18, 2018.

Device driver, Wikipedia, printed on Apr. 19, 2018.

Garbage collection (computer science), Wikipedia, printed on Sep. 26, 2018.

Graphics processing unit, Wikipedia, printed on Jul. 26, 2018.

Hypervisor, Wikipedia, printed on Apr. 19, 2018.

InfiniBand, Wikipedia, printed on Jul. 26, 2018.

Integrated circuit, Wikipedia, printed on Sep. 24, 2018.

Interlaken (networking), Wikipedia, printed on Sep. 21, 2018.

International Search Report and Written Opinion, PCT/US2019/013841, Apr. 23, 2019.

International Search Report and Written Opinion, PCT/US2019/013836, Apr. 22, 2019.

International Search Report and Written Opinion, PCT/US2019/015602, mailed May 3, 2019.

International Search Report and Written Opinion, PCT/US2019/014205, mailed May 1, 2019.

International Search Report and Written Opinion, PCT/US2019/014285, mailed May 8, 2019.

International Search Report, PCT/US2019/040413, mailed Oct. 25, 2019.

International Search Report and Written Opinion, PCT/US2019/014275, mailed May 8, 2019.

International Search Report and Written Opinion, PCT/US2020/021825, mailed Jul. 6, 2020.

Jeff Hawkins et al., "Sequence memory for prediction, inference and behaviour", In: Philosophical Transactions of the Royal Society B: Biological Sciences, pp. 1203-1209, May 1, 2009.

Message Passing Interface, Wikipedia, printed on Jul. 26, 2018.

Microsequencer, Wikipedia, printed on Sep. 21, 2018.

Oracle, "NFS Over ROMA", Retrieved on Feb. 18, 2020 from https://web.archive.org/web/20150920225910/https://docs.oracle.com/cd/E23824_01/html/821-1454/rfsrefer-154.html# (Year: 2015).

Operating system, Wikipedia, printed on Apr. 18, 2018.

PCI Express, Wikipedia, printed on Sep. 21, 2018.

Page cache, Wikipedia, printed on Apr. 18, 2018.

Page replacement algorithm, Wikipedia, printed on Jul. 31, 2018.

Page table, Wikipedia, printed on Jul. 31, 2018.

Paging, Wikipedia, printed on Apr. 18, 2018.

RAM drive, Wikipedia, printed on Apr. 18, 2018.

SerDes, Wikipedia, printed on Sep. 21, 2018.

Switched fabric, Wikipedia, printed on Jul. 26, 2018.

Translation lookaside buffer, Wikipedia, printed on Apr. 18, 2018.

Vatto, "Analyzing Intel-Micron 3D XPoint: The NextGeneration Non-Volatile Memory", 2015.

Virtual memory, Wikipedia, printed on Apr. 18, 2018.

Mmap, Wikipedia, printed on Apr. 18, 2018.

Title: Memory Systems having Controllers Embedded in Packages of Integrated Circuit Memory, U.S. Appl. No. 16/162,905, filed Oct. 7, 2018, Status Date: May 2, 2023, Inventors: Samir Mittal, et al., Status: Docketed New Case—Ready for Examination.

Title: Remote Direct Memory Access in Multi-Tier Memory Systems, U.S. Appl. No. 17/382,200, filed Jul. 21, 2021, Status Date: Jul. 10, 2023, Inventors: Parag Maharana, et al., Status: Response to Non-Final Office Action Entered and Forwarded to Examiner.

Title: Optimization of Data Access and Communication in Memory Systems, U.S. Appl. No. 16/183,234, filed Nov. 7, 2018, Status Date: Dec. 9, 2020, Inventors: Parag Maharana, et al., Status: Patented Case.

Title: Optimization of Data Access and Communication in Memory Systems, U.S. Appl. No. 17/135,774, filed Dec. 28, 2020, Status Date: Jul. 6, 2023, Inventors: Parag Maharana, et al., Status: Patented Case.

Title: Predictive Data Pre-Fetching in a Data Storage Device, U.S. Appl. No. 17/088,360, filed Nov. 3, 2020, Status Date: Jul. 24, 2023, Inventors: Alex Frolikov, et al., Status: Publications—Issue Fee Payment Verified.

* cited by examiner

OPTIMIZATION OF DATA ACCESS AND COMMUNICATION IN MEMORY SYSTEMS

RELATED APPLICATIONS

The present application is a divisional application of U.S. patent application Ser. No. 17/135,774, filed Dec. 28, 2020, issued as U.S. Pat. No. 11,706,317 on Jul. 18, 2023, which is a continuation application of U.S. patent application Ser. No. 16/183,234, filed Nov. 7, 2018, issued as U.S. Pat. No. 10,880,401 on Dec. 29, 2020, and entitled "Optimization of Data Access and Communication in Memory Systems," which claims the benefit of the filing date of Prov. U.S. Pat. App. Ser. No. 62/629,628, filed on Feb. 12, 2018, and entitled "Optimization of Communication and Data Access in Systems having Persistent Data Storage Devices," the entire disclosures of which are all hereby incorporated herein by reference.

FIELD OF THE TECHNOLOGY

At least some embodiments disclosed herein relate to memory systems in general, and more particularly, but not limited to optimization of data access and communication in memory systems.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM), etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

An operating system of a computer system can allow an application program to use virtual addresses of memory to store data in, or retrieve data from, memory components of one or more memory sub-systems of the computer system. The operating system maps the virtual addresses to physical addresses of one or more memory sub-systems connected to the central processing unit (CPU) of the computer system. The operating system implements the memory accesses specified at virtual addresses using the physical addresses of the memory sub-systems.

A virtual address space can be divided into pages. A page of virtual memory can be mapped to a page of physical memory in the memory sub-systems. The operating system can use a paging technique to access a page of memory in a storage device via a page of memory in a memory module. At different time instances, the same page of memory in a memory module can be used as proxy to access different pages of memory in the storage device or another storage device in the computer system.

A computer system can include a hypervisor (or virtual machine monitor) to create or provision virtual machines. A virtual machine is a computing device that is virtually implemented using the resources and services available in the computer system. The hypervisor presents the virtual machine to an operating system as if the components of virtual machine were dedicated physical components. A guest operating system runs in the virtual machine to manage resources and services available in the virtual machine, in a way similar to the host operating system running in the computer system. The hypervisor allows multiple virtual machines to share the resources of the computer system and allows the virtual machines to operate on the computer substantially independently from each other.

Write combining is a computer bus technique that allows data to be combined in a write combine buffer and then released for writing in a burst mode, instead of writing small chunks of data immediately. Such a technique is typically used for memory that does not need strong ordering, such as frame buffers of video cards.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
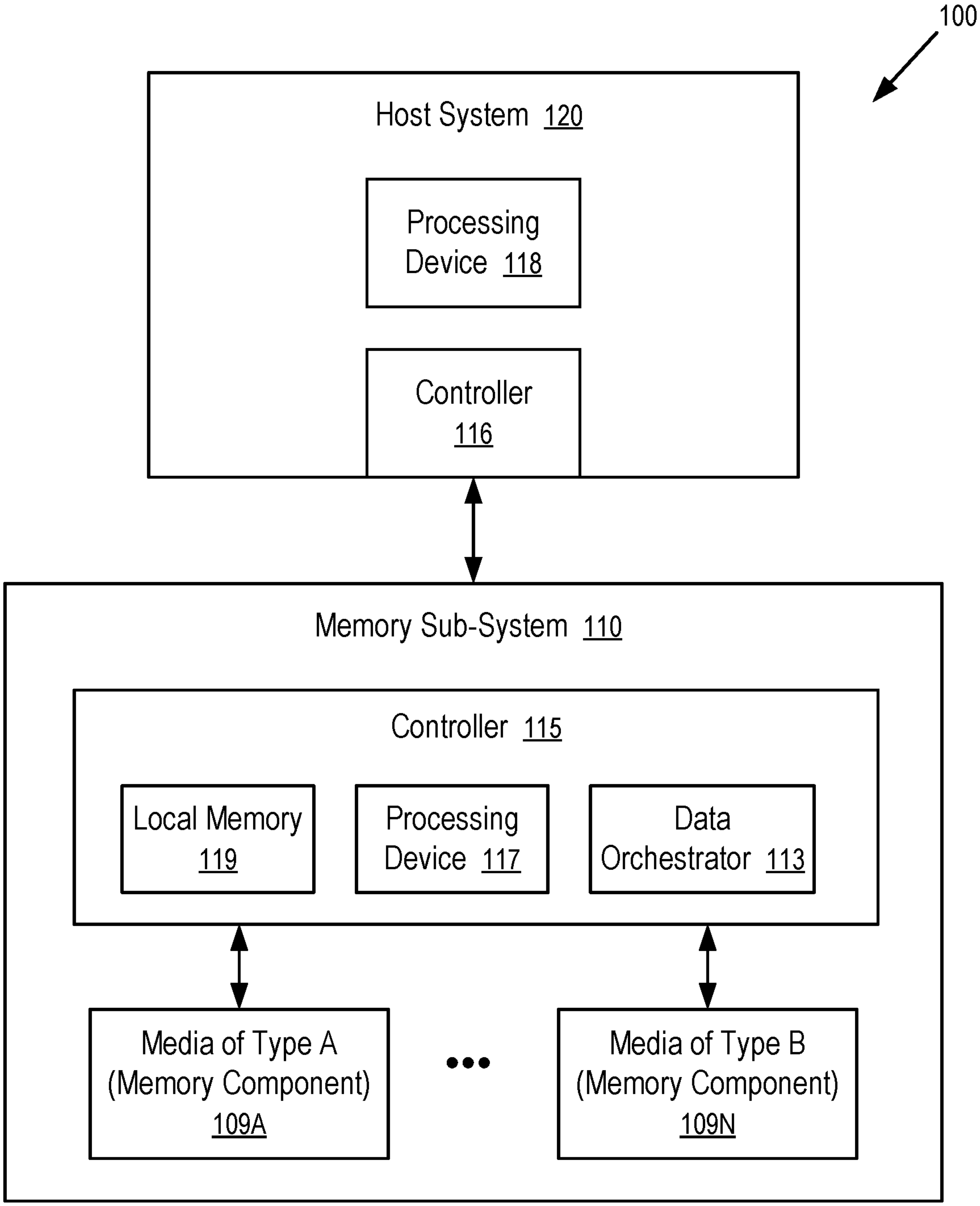
FIG. 1 illustrates an example computing system having a memory sub-system in accordance with some embodiments of the present disclosure.

At least some aspects of the present disclosure are directed to optimization of data access and communication in memory systems through tagging data access requests to assist data placement segregation in separate physical memory regions and/or through combination of data access requests to reduce protocol overhead in communication. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

A conventional solid state drive (SSD) can have a flash translation layer that performs block remapping to translate the block addresses used by a host system into physical addresses in the solid state drive. Such an SSD can place data of different contexts in a same memory region. However, operations on certain memory cells in the memory region may interfere with, or delay, other operations on other memory cells in the same memory region. As a result, when data of different contexts is placed in the same memory regions, performance of concurrent access to the memory regions for different operations for the different contexts may degrade due to memory operation interference within the SSD.

At least some aspects of the present disclosure address the above and other deficiencies by tagging data access requests to indicate the contexts of the respective data, in addition to the identification of the address of the data involved in the requests. The memory sub-system manages the data placement in physical memory regions such that data of different contexts is separated into different physical memory regions. The memory regions are identified such that operations in one memory region has reduced or minimized impact on operations in another memory region. Such an arrangement allows operations of different contexts to access the respective memory regions concurrently with reduced or minimized performance degradation. For example, different host systems may be connected to a same memory/storage device through an interconnect, a bus, a switch, and/or a computer network. When the data of the different host systems are stored in different memory regions, data access performance of host systems accessing the device concurrently can be better than when the data are mixed in memory regions. Similarly, data actively used in different virtual machines can be placed in different memory regions; data actively used in different applications can be placed in different memory regions; and/or data actively used in different user accounts can be placed in different memory regions. Further, small data access requests can be combined into batches for transmission over the interconnect, the bus, the switch, and/or the computer network to reduce the protocol overhead in communication. Such an arrangement can improve the payload throughput of the interconnect, the bus, the switch, and/or the computer network.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a data orchestrator 113 in the memory sub-system 110 that can tag data access requests to indicate the desirable separation of data in their physical placements in media (e.g., 109A to 109N), combine data access requests for transmitting with reduced protocol overhead to the media (e.g., 109A to 109N), and/or perform predictive data movements among media of different tiers. In some embodiments, the controller 115 in the memory sub-system 110 includes at least a portion of the data orchestrator 113. In other embodiments, or in combination, the controller 116 and/or the processing device 118 in the host system 120 includes at least a portion of the data orchestrator 113. For example, the controller 115, the controller 116, and/or the processing device 118 can include logic circuitry implementing the data orchestrator 113. For example, the controller 115, or the processing device 118 (processor) of the host system 120, can be configured to execute instructions stored in memory for performing the operations of the data orchestrator 113 described herein. In some embodiments, the data orchestrator 113 is implemented in an integrated circuit chip disposed in the memory sub-system 110. In other embodiments, the data orchestrator 113 is part of an operating system of the host system 120, a device driver, or an application.

The data orchestrator 113 can optionally attach tags to access requests. Different tags indicate different contexts of data, where data of different contexts can be actively accessed concurrently, e.g., in different host systems, in different virtual machines running in a same host system, in different applications running in a same or different virtual machines, and/or in different user accounts. Based on the tags, data of different contexts can be stored in separate physical regions that have reduced or minimum interference with one another in memory access for data.

The data orchestrator 113 can optionally buffer or cache data access requests to combine the data access for reduced communication protocol overhead in transmitting the data access requests over a set of one or more connections to the media (e.g., 109A or 109N). For example, each media (e.g., 109A or 109N) can be an integrated circuit device optionally encapsulated within an integrated circuit package. An embedded controller can be provided within the integrated circuit package to allow data access requests to be communicate to the integrated circuit device via a serial connection. For example, the serial connection can be in accordance with a PCIe standard, a USB standard, a SATA standard, etc. To facilitate the communication data access requests through the connection, additional data specific to a communication protocol of the connection is added, which may not be necessary when another communication connection is used. Such additional data is the protocol overhead; and the data necessary for the data access request independent of the communication protocol used for the connection is the payload. Combining data access requests can reduce overall protocol overhead and improve the system performance. Some details and examples of embedded controllers can be found in U.S. patent application Ser. No. 16/162,905, filed on Oct. 17, 2018, issued as U.S. Pat. No. 12,135,876 on Nov. 5, 2024, and entitled "Memory Systems having Controllers Embedded in Packages of Integrated Circuit Memory."

To facilitate combination of data access, the data orchestrator 113 can optionally separate data access requests into different streams and determine current data placement in the memory sub-system 110 based on characteristics of the data streams. For example, data accessed randomly with a frequency higher than a threshold can be placed in a media (e.g., 109A) of a high-performance tier, data accessed randomly with a frequency lower than the threshold hold can be placed in a media of a medium-performance tier, and data accessed sequentially can be placed in a media (e.g., 109N) of a low-performance tier. For example, the media (e.g., 109A) of the high-performance tier can be implemented using DRAM and/or cross point memory; the media of the medium-performance tier can be implemented using flash memory with single level cells (SLCs); and the media (e.g., 109N) of the low-performance tier can be implemented using flash memory with triple level cells (TLCs) and/or quad-level cells (QLCs). As the data usage frequency changes, the data orchestrator 113 can change the data placement in different memory tiers. A higher performance memory tier can be used as a buffer or cache for a lower performance memory tier. Thus, the data orchestrator 113 can coalesce and/or serialize data access for reduced communication protocol overhead. Some details and examples of data stream segregation can be found in U.S. patent application Ser. No. 16/166,624, filed on Oct. 22, 2018, published as U.S. Pat. No. 2019/0243771 on Aug. 8, 2019, and entitled "Accelerate Data Access in Memory Systems via Data Stream Segregation."

The data orchestrator 113 can optionally predict data usages and movements across different tires of memories, faster memory (e.g., 109A) and slower memory (e.g., 109N). Applications may access certain data in sequences; and certain objects may be used together. Thus, the use of a data item in a user account, in an application, in a virtual machine, as part of an object, can be indication of the subsequent use of another related data item. Before the related data item is accessed, the data orchestrator 113 can instruct the controller 115 to rearrange the physical storage locations of the data items in the memory sub-system 110, such that at a time when the processing device 118 of the host system 120 accesses the related data item, the data item is already in the faster memory (e.g., 109A). Thus, the operation performance of the computing system is improved. The predictive model of the data orchestrator 113 can be implemented via an artificial neural network, which can be initially trained offline using historic data access records initially and then continuously trained in real time use using the real time data access records. Further details with regards to the operations of the data orchestrator 113 are described below.

In one example, the central processing unit (CPU) can access two sets of memory provided in one or more memory systems connected to the CPU. For example, one set of memory can be slower than the other set of memory; and the central processing unit (CPU) can be configured to access the slower set of memory via the faster set of memory using a paging technique. The faster set of memory can be used as the cache memory of the slower set of memory. For example, one set of memory cannot be directly addressable by the CPU and is coupled to the other set of memory that is directly addressable by the CPU; and the central processing unit (CPU) can be configured to access a set of memory that is not directly addressable via the set of memory that is directly addressable in a way similar to the use of the paging technique. The set of memory that can be accessed directly can be used as the cache memory of the set of memory that cannot be accessed directly.

When a faster memory is used as a cache of a slower memory, the data stored in the faster memory has a corresponding copy in the slower memory. When the faster memory is changed, the corresponding copy in the slower memory becomes out of date. The changed content in the faster memory is to be flushed to the slower memory for update.

Alternatively, the content in the slower memory can be accessed without going through the faster memory in some instances; and the content in the faster memory may not have a corresponding copy in the slower memory. The distribution of the content in the slower memory and the faster memory can be dynamically changed to optimize the operating performance for the current workload. In such a situation, the faster memory can still be considered as a cache for tracking cache hit ratio. For example, if a data item being accessed is serviced from the faster memory, a cache hit is counted; and if a data item being accessed is serviced from the slower memory, a cache miss is counted.

In some instances, a memory virtualizer can be implemented in a device driver of a memory component to virtualize memory access to the memories of different tiers to shield the differences in the memory components 109A to 109N from applications and/or virtual machines. The memory virtualizer automatically adjusts data storage locations across the memories of different tiers to optimize the performance of the computing system. Some details and examples of memory virtualizers can be found in U.S. patent application Ser. No. 16/054,719, filed Aug. 3, 2018, issued as U.S. Pat. No. 11,416,395 on Aug. 16, 2022, and entitled "Memory Virtualization for Accessing Heterogeneous Memory Components".

When a data item being accessed is in the slower set of memory but not in the faster set of memory, the data item can be accessed in the slower set of memory directly, or swapped to the faster set of memory for accessing in the faster set of memory, or cached in the faster set of memory. If the workload of accessing the data item is predicted by the data orchestrator 113, the data orchestrator 113 instructs the controller 115 to swap the data item to the faster set of memory, or cache the data item in the faster set of memory, before the data access. After the data movement performed in accordance with workload prediction, the data access can be served from the faster set of memory when the data item is accessed. Since the data access is serviced from the faster set of memory, the time to complete the data access is shorter than servicing from the slower set of memory, or swapping to the faster set of memory for servicing, or loading the data from the slower set of memory to the faster set of memory for caching and then servicing.

For example, when a page of virtual memory being accessed is currently in the slower set of memory but not in the faster set of memory, a page can be allocated from the faster set of memory to service the page in the slower set of memory; and the data of the page can be fetched from the slower set of memory and stored in the allocated page in the faster set of memory, such that the data access of the page of the virtual memory can be made via accessing the allocated page in the faster set of memory in subsequent operations.

In some instances, swapping a page takes a time longer than simply access a requested data element from the slower memory. Thus, the requested data element is first serviced to the requester, while the page swapping is performed to speed up subsequent access to the data elements in the hot page. Thus, the overall performance is better than holding the request for the data element until the page swap is completed.

Further, information related to the use of the pages in the slower set of memory can be used to train a self-learning prediction engine in predicting the use of the pages. For example, a supervised machine learning technique can be used to train, using the information, an artificial neural network to predict the use of the pages in the slower set of memory by reducing the errors between predictions and the actual use of the pages. After the training of the artificial neural network, the prediction engine can use the current information to predict the next pages to be used. Further, the training, prediction, and feedback from the actual usage following the prediction for further training can be performed in a continuous fashion to adapt the prediction model of the artificial neural network to the most recent usage patterns of memory pages.

In response to the memory usage prediction that a page in the slower set of memory is to be used soon, the data orchestrator 113 can instruct the controller 115 to proactively swap or cache the page of data from the slower set of memory to the faster set of memory, such that when needed for processing, the page of data is already in the faster set of memory, which arrangement improves the data access speed of the page of data.

The accuracy of the prediction can be measured against the subsequent actual page use; and the prediction and the subsequent actual page use can be used to further train or adjust the artificial neural network to track the most recent usage patterns of memory pages.

Alternatively, or in combination, the machine learning-based prediction can be replaced or augmented with policy based prediction rules. For example, pages storing resident codes (e.g., in lower addresses) can be maintained in the faster set of memory when possible to reduce swapping of frequently used pages. For example, a huge page can be loaded into the faster set of memory when a page that is a portion of the huge page is being accessed. For example, predictions can be made at least in part using heuristic rules, based on indications such as whether the pages are accessed sequentially or randomly, whether the data access is in a steady state mode or in a bursty mode, and/or the logical relations between pages (and pages of different sizes).

Some details and examples regarding the prediction techniques can be found in U.S. patent application Ser. No. 16/032,331, filed Jul. 11, 2018, issued as U.S. Pat. No. 10,877,892 on Dec. 29, 2020, and entitled "Predictive Paging to Accelerate Memory Access".

Figure 2:
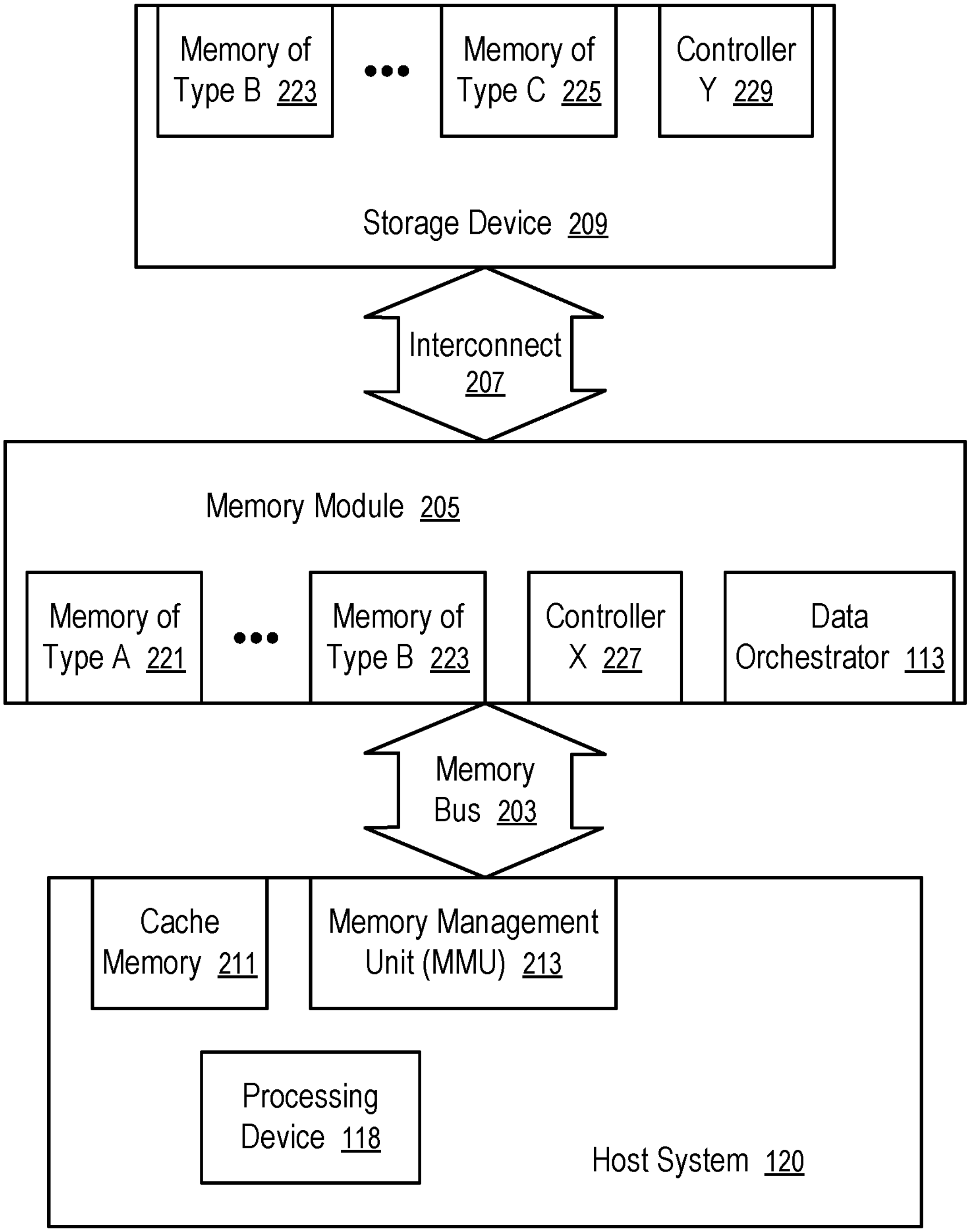
FIG. 2 shows a computing system having different tiers of memory and a data orchestrator to optimize data locations in accordance with at least some embodiments disclosed herein.

FIG. 2 shows a computing system having different tiers of memory and a data orchestrator to optimize data locations in accordance with at least some embodiments disclosed herein.

The computing system of FIG. 2 includes a host system 120, a memory module 205 connected to the host system 120 via a memory bus 203, and a storage device 209 connected to the memory module 205 via an interconnect 207. The storage device 209 and/or the memory module 205 are examples of the memory sub-system 110 illustrated in FIG. 1.

The host system 120 has a processing device 118, which can be a central processing unit or a microprocessor with one or more processing cores. The host system 120 can have a memory management unit 213 and cache memory 211. The memory management unit 213 and/or at least a portion of the cache memory 211 can be optionally integrated within the same integrated circuit package of the processing device 118.

The memory module 205 illustrated in FIG. 2 has multiple types of memory (e.g., 221 and 223). For example, memory of type A 221 is faster than memory of type B 223.

For example, the memory bus 203 can be a double data rate bus; and the interconnect 207 can be a peripheral component interconnect express (PCIe) bus, a serial advanced technology attachment (SATA) bus, a universal serial bus (USB) bus, and/or a storage area network. Memory of type B 223 in the memory module 205 can be accessed at a speed faster than accessing memory of type B 223 in the storage device 209.

The storage device 209 illustrated in FIG. 2 has multiple types of memory (e.g., 223 and 225). For example, memory of type B 223 is faster than memory of type C 225.

In general, a plurality of memory modules (e.g., 205) can be coupled to the memory bus 203; and a plurality of storage devices (e.g., 209) can be coupled to the peripheral interconnect 207. In some instances, the peripheral interconnect 207 and the storage devices (e.g., 209) are optional and can be absent from the computing system. In other instances, the memory bus 203 and the memory modules (e.g., 205) can be optional and can be absent from the computing system.

In a possible configuration when a plurality of memory modules (e.g., 205) are coupled to the memory bus 203, one of the memory modules (e.g., 205) has memory of type A 221; and another of the memory modules has memory of type B 223 that is accessible at a speed lower than the memory of type A 221 in a separate memory module (e.g., 205).

Similarly, in a possible configuration when a plurality of storage devices (e.g., 205) are coupled to the interconnect 207, one of the storage device (e.g., 209) has memory of type B 223, and another of the storage devices has memory of type C 225 that is accessible at a speed lower than the memory of type B 221 in a separate storage device (e.g., 209).

The processing device 118 and/or the MMU 213 are configured via instructions (e.g., an operating system and/or one or more device drivers) to access a portion of memory in the computer system via another portion of memory in the computer system using a paging technique and/or a memory map interface.

For example, memory of type B 223 of the memory module 205 can be accessed via memory of type A 221 of the memory module 205 (or another memory module).

For example, memory of type B 223 of the storage device 209 can be accessed via memory of type A 221 of the memory module 205 and/or via memory of type B 223 of the memory module 205.

For example, memory of type C 225 of the storage device 209 can be accessed via memory of type A 221 of the memory module 205, via memory of type B 223 of the memory module 205, and/or via memory of type B 223 of the storage device 209 (or another storage device).

For example, in some instances, memory of type A 221 and memory of type B 223 in the same memory module 205 (or different memory modules) are addressable directly and separately over the memory bus 203 by the memory management unit 213 of the processing device 118. However, since the memory of type B 223 is slower than memory of type A 221, it is desirable to access the memory of type B 223 via the memory of type A 221.

In other instances, memory of type B 223 of the memory module 205 is accessible only through addressing the memory of type A 221 of the memory module 205 (e.g., due to the size restriction in the address portion of the memory bus 203).

The data orchestrator 113 can instruct a controller X 227 in the memory module 205 to perform data transfer/movement between the memory of type A 221 and the memory of type B 223 within the memory module 205, especially when the memory of type B 223 of the memory module 205 is not directly addressable using the memory bus 203.

Further, the data orchestrator 113 can instruct a controller X 227 in the memory module 205 to communicate with a controller Y 229 in the storage device 209 to perform data transfer/movement between memories 223 to 225 in the storage device 209, and/or between the storage device 209 and the memory module 205.

In one variation, the memory (e.g., 221 and 223) of the memory module 205 can have the same performance individually within the memory module 205; however, the memory management unit 213 and/or the processing device 118 are restricted to access via the memory 223 via the memory 221 (e.g., due to the size restriction in the address portion of the memory bus 203). Thus, the memory 223 appears to be slower than the memory 221 to the processing device 118.

In general, the memory sub-systems (e.g., 205 and 209) can include media, such as memory (e.g., 221, . . . , 223, . . . , 225). The memory (e.g., 221, . . . , 223, . . . , 225) can include volatile memory, non-volatile memory (NVM), and/or a combination of such. In some embodiments, the computer system includes at least one memory sub-system that is a storage device 209. An example of a storage device 209 is a solid-state drive (SSD). In some embodiments, the computer system includes at least one memory sub-system that is a hybrid memory/storage system configured as a memory module 205. The processing device 118 can write data to each of the memory sub-systems (e.g., 205 and 209) and read data from the memory sub-systems (e.g., 205 and 209) directly or indirectly.

The computing system of FIG. 2 can be used to implement a desktop computer, laptop computer, network server, mobile device, or such computing device that includes a memory and a processing device. The processing device 118 can read data from or write data to the memory sub-systems (e.g., 205 and 209).

The processing device 118 can be coupled to a memory sub-system (e.g., 205, 209) via one or more physical interface (e.g., 203, 207).

As used herein, "coupled to" generally refers to a connection between components, which can be an indirect communicative connection or direct communicative connection (e.g., without intervening components), whether wired or wireless, including connections such as, electrical, optical, magnetic, etc.

Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc.

The physical host interface can be used to transmit data between the processing device 118 and the memory sub-system (e.g., 209). The computer system can further utilize an NVM Express (NVMe) interface to access the memory (e.g., 223, . . . , 225) when the memory sub-system 209 is coupled with the peripheral interconnect 207 via the PCIe interface. The physical host interface can provide an interface for passing control, address, data, and other signals between the memory sub-system (e.g., 209) and the processing device 118.

In general, a memory sub-system (e.g., 205 and 209) includes a printed circuit board that connects a set of memory devices, such as memory integrated circuits, that provides the memory (e.g., 221, . . . , 223, . . . , 225). The memory (e.g., 221, . . . , 223, . . . , 225) on the memory sub-system (e.g., 205 and 209) can include any combination of the different types of non-volatile memory devices and/or volatile memory devices.

An example of non-volatile memory devices includes a negative-and (NAND) type flash memory or a negative-or (NOR) type flash memory. A memory integrated circuit can include one or more arrays of memory cells, such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system 120. Although non-volatile memory devices such as NAND type flash memory are described, the memory integrated circuits can be based on any other type of memory such as a volatile memory. In some implementations, the memory (e.g., 221, . . . , 223, . . . , 225) can include, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and/or a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices can be grouped as memory pages or data blocks that can refer to a unit of the memory device used to store data.

A memory sub-system (e.g., 205 or 209) can have a controller (e.g., 227 or 229) that communicate with the memory (e.g., 221, . . . , 223, . . . , 225) to perform operations such as reading data, writing data, or erasing data in the memory (e.g., 221, . . . , 223, . . . , 225) and other such operations, in response to requests, commands or instructions from the processing device 118 and/or the memory management unit (MMU) 213. The controller (e.g., 227 or 229) can include hardware such as one or more integrated circuits and/or discrete components, a buffer memory, or a combination thereof. The controller (e.g., 227 or 229) can be a microcontroller, special purpose logic circuitry (e.g., a field programmable gate array (FPGA), an application specific integrated circuit (ASIC), etc.), or another suitable processor. The controller (e.g., 227 or 229) can include one or more processors (processing devices) configured to execute instructions stored in local memory.

The local memory of the controller (e.g., 227 or 229) can include an embedded memory configured to store instructions for performing various processes, operations, logic flows, and routines that control operation of the memory sub-system (e.g., 205 or 209), including handling communications between the memory sub-system (e.g., 205 or 209) and the processing device 118/MMU 213, and other functions described in greater detail below. The local memory of the controller (e.g., 227 or 229) can include read-only memory (ROM) for storing micro-code and/or memory registers storing, e.g., memory pointers, fetched data, etc.

While the example memory sub-systems (e.g., 205 and 209) in FIG. 2 have been illustrated as including controllers (e.g., 227 and 229), in another embodiment of the present disclosure, a memory sub-system (e.g., 205 or 209) may not include a controller (e.g., 227 or 229), and can instead rely upon external control (e.g., provided by the MMU 213, or by a processor or controller separate from the memory sub-system (e.g., 205 or 209)).

In general, the controller (e.g., 227 or 229) can receive commands, requests or instructions from the processing device 118 or MMU 213 in accordance with a standard communication protocol for the communication channel (e.g., 203 or 207) and can convert the commands, requests or instructions in compliance with the standard protocol into detailed instructions or appropriate commands within the memory sub-system (e.g., 205 or 209) to achieve the desired access to the memory (e.g., 221, . . . , 223, . . . , 225). For example, the controller (e.g., 227 or 229) can be responsible for operations such as wear leveling operations, garbage collection operations, error detection and error-correcting code (ECC) operations, encryption operations, caching operations, and address translations between a logical block address and a physical block address that are associated with the memory (e.g., 221, . . . , 223, . . . , 225). The controller (e.g., 227 or 229) can further include host interface circuitry to communicate with the processing device 118 via the physical host interface. The host interface circuitry can convert the commands received from the processing device 118 into command instructions to access the memory devices (e.g., 221, . . . , 223, . . . , 225) as well as convert responses associated with the memory devices (e.g., 221, . . . , 223, . . . , 225) into information for the processing device 118.

The memory sub-system (e.g., 205 or 209) can also include additional circuitry or components that are not illustrated. In some implementations, the memory sub-system (e.g., 205 or 209) can include a cache or buffer (e.g., DRAM) and address circuitry (e.g., a row decoder and a column decoder) that can receive an address from the controller (e.g., 227 or 229) or the MMU 213 and decode the address to access the memory (e.g., 221, . . . , 223, . . . , 225).

In one example, the interconnect 207, or the memory bus 203, has one or more connectors to provide the memory sub-system (e.g., 209 or 205) with power and/or communicate with the memory sub-system (e.g., 209 or 205) via a predetermined protocol; and the memory sub-system (e.g., 209 or 205) has one or more connectors to receive the power, data and commands from the processing device 118. For example, the connection between the connector on the interconnect 207 and the connector on a memory sub-system (e.g., 209) can utilize a PCIe bus or a SATA bus.

In some instances, the interconnect 207 is connected to the host system 120 without going through the memory module 205 and/or the memory bus 203. When the storage device 209 is coupled to the host system 120 without going through the memory module 205, a data orchestrator 113 can be implemented in the storage device 209 in a way similar to the data orchestrator 113 in the memory module 205.

In some instances, the data orchestrator 113 can be implemented at least in part in the host system 120.

In general, the processing device 118, the controller 227, and/or the data orchestrator 113 can execute one or more operating systems to provide services, including acceleration of memory access in which a portion of memory in the computer system is accessed via another portion of memory in the computer system using a paging technique and/or a memory map interface, as further discussed below.

Figure 3:
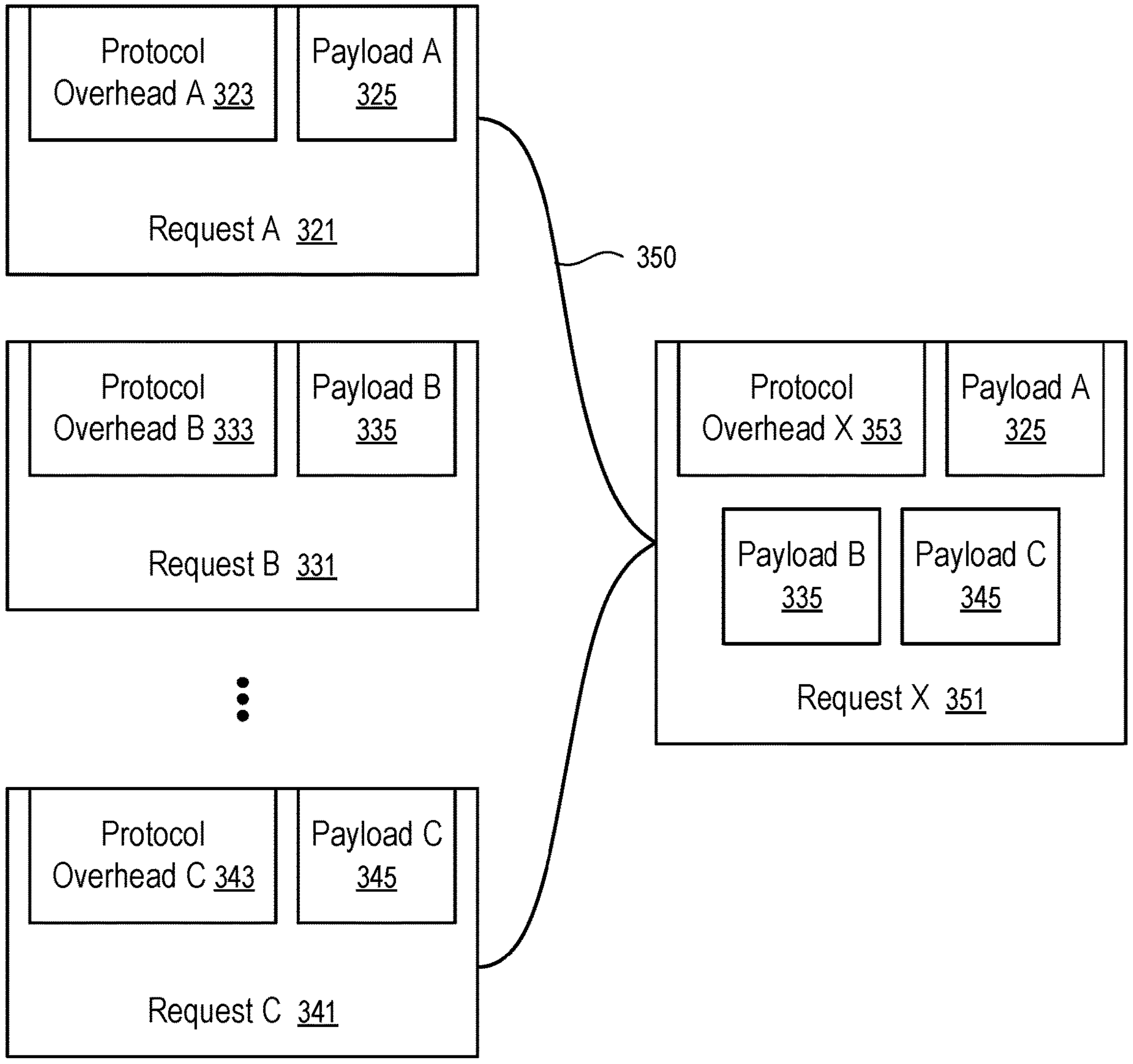
FIG. 3 shows a technique to combine data access requests to reduce protocol overhead for transmitting data access requests.

In some embodiments, the data orchestrator 113 can combine data access requests to reduce communication protocol overhead for transmitting the data access requests to the storage device 209 over the interconnect 207, as illustrated in FIG. 3.

FIG. 3 shows a technique to combine data access requests to reduce protocol overhead for transmitting data access requests.

As illustrated in FIG. 3, a set of data access requests 321, 331, . . . , 341 of a same type (e.g., read, write, or erase) can be directed to a same media (e.g., 109A or 109N in FIG. 1; 223 or 225 of the storage device 209 of FIG. 2). To separately communicate the data access requests 321,

331, . . . , 341 to the media (e.g., through the interconnection 207 and/or via a serial communication connection), protocol overheads 323, 333, . . . , 343 are required to transmit the payloads 325, 335, . . . , 345. When the payload 325, 335, or 345 is small, the ratio between the respective protocol overhead 323, 333, . . . , or 343 and the payload 325, 335, or 345 is large. In such a scenario, a significant portion of the communication bandwidth of the communication channel (e.g., interconnection 207 and/or via a serial communication connection between the data orchestrator 113 and the media) is used to transport the protocol overheads 323, 333, . . . , and 343.

To improve the utilization rate of the communication channel, the data orchestrator 113 can combine 350 the payloads 325, 335, . . . , 345 of the requests to generate a combined request 351 that has a smaller ratio between its protocol overhead 353 and its combined payloads 325, 335, . . . , and 345. Transmitting the combined request 351, instead of the separate requests 321, 331, . . . , and 341 improves the performance of the communication channel.

For example, the set of requests 321, 331, . . . , 341 can be write requests. The payloads 325, 335, . . . , 345 can include addresses of the write requests 321, 331, . . . , 341 and data to be stored at the addresses.

For example, the set of requests 321, 331, . . . , 341 can be erasure requests. The payloads 325, 335, . . . , 345 can include addresses of data to be erased via the requests 321, 331, . . . , 341.

For example, the set of requests 321, 331, . . . , 341 can be read requests. The payloads 325, 335, . . . , 345 can include addresses of data to be retrieved via the requests 321, 331, . . . , 341. In some implementations, the data orchestrator 113 tracks the read requests 321, 331, . . . , 341 after the transmission of the combined request 351; and in response to a response to the combined request 351, the data orchestrator 113 separately generates responses for the read requests 321, 331, . . . , and 341 that correspond to the combined request 351, using the retrieved data provided in the response to the combined request 351. Thus, the data orchestrator 113 can provide individual responses to the requests 321, 331, . . . , 341, as if the requests 321, 331, . . . , 341 had been separately transmitted over the communication channel to obtain the individual responses directly from the media.

In general, when a communication protocol used on the communication channel requires responses to requests (e.g., read, write, and/or erasure), the data orchestrator 113 can track the relation between the original requests 321, 331, . . . , 341 and the combined request 351 and generate the individual responses for the original requests 321, 331, . . . , 341 using the response received for the combined request 351, in a way similar to that discussed above in connection with the response processing for read requests.

Figure 4:
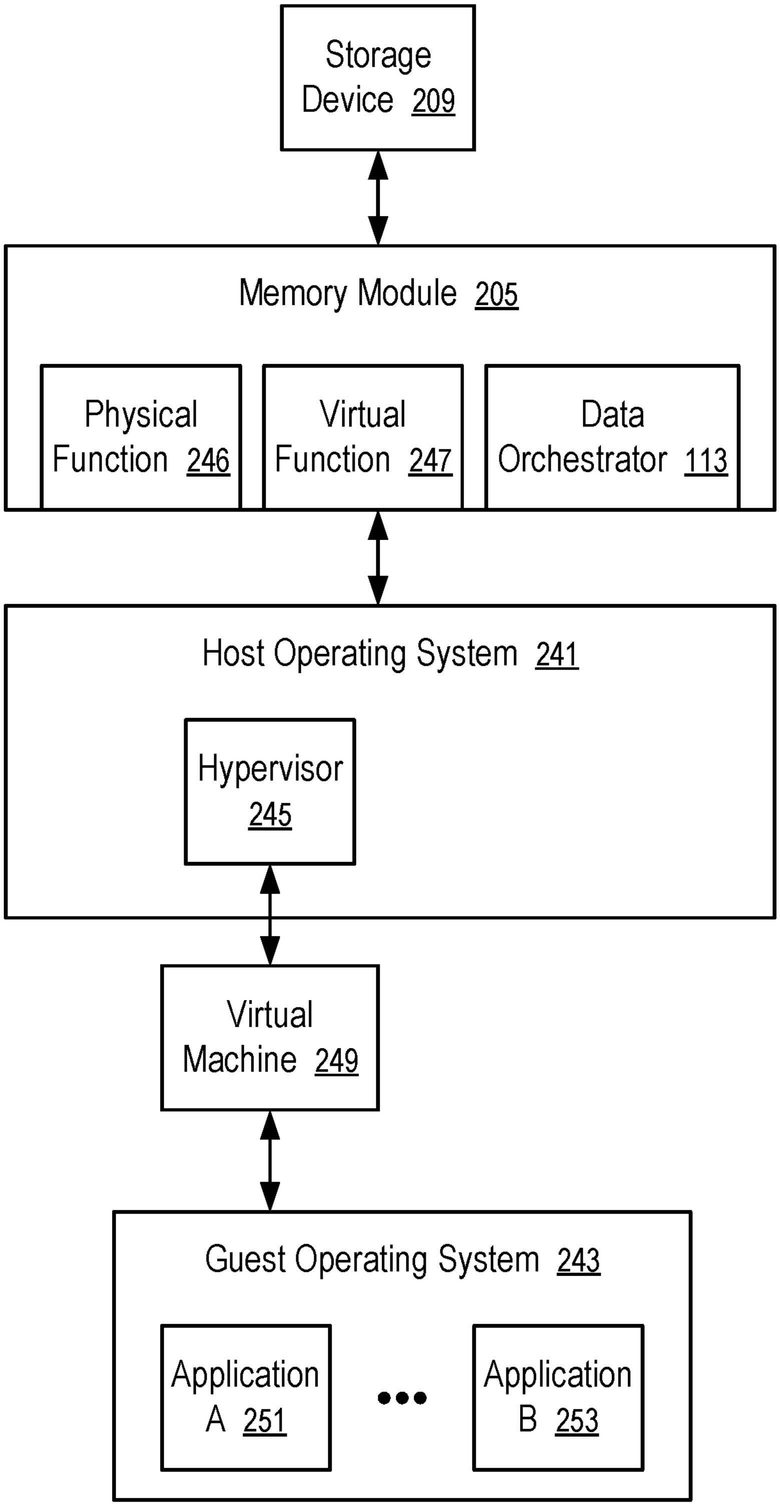
FIG. 4 shows a system having a data orchestrator.

FIG. 4 shows a system having a data orchestrator 113. For example, the system of FIG. 4 can be implemented in a computer system of FIG. 1 or 2.

The system of FIG. 4 includes a host operating system 241 that can run in the processing device 118 of the computer system of FIG. 1 or 2. The host operating system 241 includes one or more device drives that provides memory services using the memory (e.g., 221, . . . , 223, . . . , 225) of memory sub-systems, such as the memory module 205 and/or the storage device 209.

The host operating system 241 includes a hypervisor 245 that provisions a virtual machine 249. The virtual machine 249 has virtual hardware implemented via the resources and services provided by the host operating system 241 using the hardware of the computing system of FIG. 1 or 2. For example, the hypervisor 245 can provision virtual memory as part of the virtual machine 249 using a portion of the memory (e.g., 221, . . . , 223, . . . , 225) of memory sub-systems, such as the memory module 205 and/or the storage device 209.

The virtual machine 249 allows a guest operating system 243 to provide resources and/or services to applications (e.g., 251, . . . , 253) running in the guest operating system 243, in a way as the operating system 243 running on a physical computing machine that has the same or similar set of hardware as provisioning in the virtual machine. The hypervisor 245 manages the mapping between the virtual hardware provisioned in the virtual machine and the services of hardware in the computing system managed by the host operating system 241.

FIG. 4 illustrates an instance in which a virtual machine 249 is provisioned by the hypervisor 245. In general, the hypervisor 245 can provision a plurality of virtual machines (e.g., 249) that can run the same guest operating system 243, or different guest operating systems (e.g., 243). Different sets of users and/or application programs can be assigned to use different virtual machines.

In some instances, the host operating system 241 is specialized to provide services for the provisioning of virtual machines and does not run other application programs. Alternatively, the host operating system 241 can provide additional services to support other application programs, such as applications (e.g., 251, . . . , 253).

In FIG. 4, the hypervisor 245 is configured to use a single-root I/O Virtualization to organize data streams of different characteristics/attributes. For example, the memory module 205 has a physical function 246 that can implement a plurality of virtual functions (e.g., 247). A virtual function 247 provides the service of the memory module 205 via the physical function 246. The hypervisor 245 allocates and reserves the virtual function 247 for memory access by a particular virtual machine 249, a particular application (e.g., 251 or 253), a particular user account, etc. Thus, the identity of the virtual function 247 used to access the memory module 205 can be used to infer the data usage information of the data access, such as the identities of the virtual machine 249, the application 251 and/or the user account that are associated with and/or responsible for the data access made using the virtual function 247. Such information can be used in the data orchestrator 113 in machine learning to predict data workload and/or movements and in making real time predictions.

For example, the data orchestrator 113 can buffer or cache requests and determine physical data storage locations based on recent and/or predicted data access frequencies.

For example, the data orchestrator 113 can combine small data access requests 321, 331, . . . , 341 into a combined data access request 351 to reduce communication protocol overheads when the data access requests 321, 331, . . . , 341 are determined to be transmitted over the interconnect 207 (e.g., a serial communications connection).

For example, the data orchestrator 113 can provide tags in data access requests of different contexts. Examples of the contexts include the usage of the data in different host systems, different virtual machines, different applications, and/or different user accounts. The tags can be used by a storage device 209 and/or a media (e.g., 109A, 109B, 223, 225) to place the data in different physical regions to reduce or eliminate interference in concurrent operations on the data of different contexts.

In some instances, the separation of data of different contexts into physical memory regions is performed at least in part by the data orchestrator 113. For example, the controller 227 and/or the data orchestrator 113 can have separate communication connections to the media (e.g., 109A, 109B, 223, 225). Based on the tags and/or context, the data orchestrator 113 can determine the separate data placements on the memory components (e.g., 109A, 109B, 223, 225) that are separately connected to the controller 227 and/or the data orchestrator 113 to allow concurrent communications with the memory components (e.g., 109A, 109B, 223, 225) for increased bandwidth for data access.

In some instances, the context in which a set of data is being used can change from time to time. When the context of the data is changed, the data orchestrator 113 and/or the media can adjust the physical data placement locations to achieve better context-based data separate for the contexts that are currently active and/or that are predicted to be active in the subsequent time period.

For example, the data orchestrator 113 can be trained to predict the use of a data item in a slower memory and load the data item into a faster memory before the data item actually requested for use by the virtual machine 249, the application 251 running in the virtual machine, and/or a user account operating the application 251. The prediction reduces the time between a request to use the data item and the availability of the item in the faster memory by loading, transferring, and/or, caching the item into the faster memory before the request to use the item reaches the memory module 205, which accelerates the data access of the page.

For example, the slower memory can be the memory 223 in the memory module 205 and the faster memory be the memory 221 in the same memory module 205 (or another memory module connected to the same memory bus 203 as the memory module 205).

For example, the slower memory can be the memory 223 in the storage device 209; and the faster memory can be the memory 223 of the same type in the memory module 205, or the memory 221 in the memory module 205.

For example, the slower memory can be the memory 225 in the storage device 209; and the faster memory can be the memory 223 in the same storage device 209 or another storage device connected to the interconnect 207, or memory (e.g., 223 or 221) in the memory module 205.

The predictive data movement can be performed within a same memory sub-system, such as within the same memory module 205, the same storage device 209, or the same combination of the memory module 205 and the storage device 209, to avoid or reduce congestion in communication channels connected to the processing device 118, such as the memory bus 203 and/or the interconnect 207. For example, the predictive data movement can be performed to copy data from the slower memory 223 in the memory module 205 to the faster memory 221 in the memory module 205, under the control of a controller 227 in the memory module 205 in response to one or more command, request, or instruction from the data orchestrator 113. For example, the predictive data movement can be performed to copy data from the slower memory 225 in the storage device 209 to the faster memory 223 in the storage device 209, under the control of a controller 229 in the storage device 209 in response to one or more command, request, or instruction from the data orchestrator 113. For example, the predictive data movement can be performed to copy data from the storage device 209 to the memory module 205, under the control of the controller 227 and the controller 229 in the storage device 209, in response to one or more command, request, or instruction from the data orchestrator 113.

In one embodiment, the hypervisor 245 not only requests the device driver to access a memory (e.g., 221, . . . , 223, . . . , or 225) in a memory sub-system (e.g., memory module 205 or storage device 209) but also provides the device driver with information that can be used in making predictions of which data items in the memory (e.g., 221, . . . , 223, . . . , or 225) are likely to be used in a subsequent time period and which data items in the memory (e.g., 221, . . . , 223, . . . , or 225) are unlikely to be used in the subsequent time period. The information can be provided at least in part via the use of virtual functions (e.g., 247) that are pre-associated with certain data usage attributes, such as virtual machine 249, application 251, user account, etc.

For example, a page that is likely to be used can be referred to as a hot page; and a page that is unlikely to be used can be referred to as a cold page. The likelihood of a page being used in the subsequent time period can be referred to as the temperature of the page. The data orchestrator 113 uses the information provided/identified by the hypervisor 245 to predict the temperatures of the pages, moves cold pages from faster memory to slower memory, and moves hot pages from slower memory to faster memory to optimize the distribution of the pages in the memory (e.g., 221, . . . , 223, . . . , or 225) and accelerate data access.

Examples of information provided by the hypervisor 245 and used by the data orchestrator 113 to make the predictions include: sequences of pages being used in a prior time period, instances of requests to load pages from the slower memory to the faster memory, content attributes of the pages, ownership attributes of the pages, identifications of users or applications of the pages, an indication of whether pages are accessed in a sequential mode in a virtual machine and/or in a user account, an indication of whether page accesses are in a steady state, an indication whether a page used is associated with a huge page, mapping between data blocks and objects, etc.

The information provided by the hypervisor 245 can also be used to identify the context of the usage of data. Thus, data of different contexts can be separated into different physical memory regions for reduced interference from concurrent operations. The interference can be caused by the bandwidth limitations in communication connections between the data orchestrator 113 and/or memory constructions.

For example, flash memory can have a set of memory cells in page, and a set of pages in a block. Data can be retrieved from the flash memory one page at a time, but erased one block at a time. When data of different contexts is stored in a same block, erasing the data of one context can cause the relocation of the data of another context that is currently in the block. Thus, it can be advantageous to separate the data of different contexts into different blocks, different memory chips, different storage devices, etc. to reduce interference.

Figure 5:
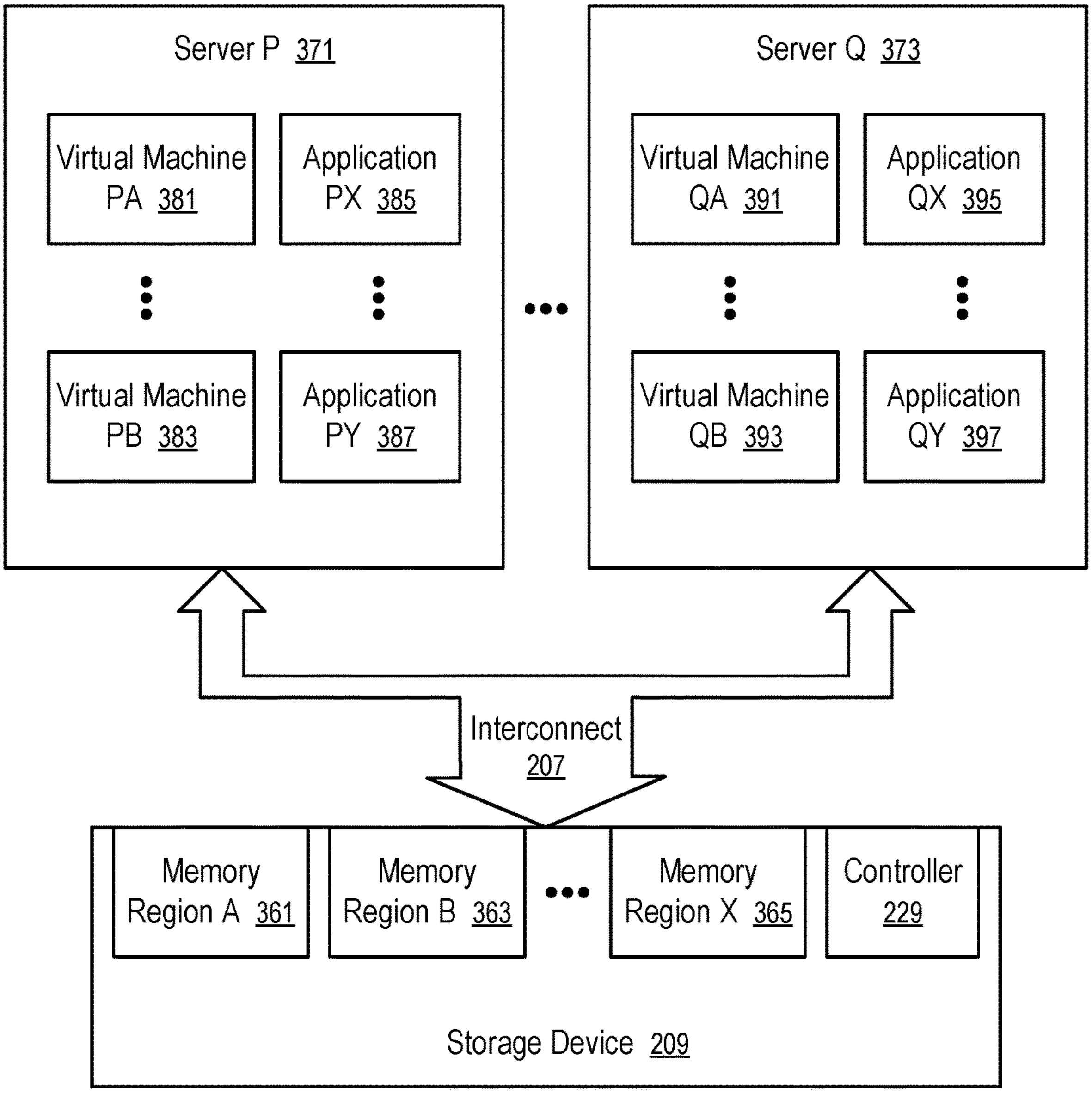
FIG. 5 shows a technique to group data in separate physical memory regions.

FIG. 5 shows a technique to group data in separate physical memory regions. For example, the technique of FIG. 5 can be implemented in the memory sub-system 110 of FIG. 1, using a data orchestrator 113 of FIG. 2, and/or with virtual machines (e.g., 249) of FIG. 4.

In FIG. 5, multiple servers 371, . . . , 373 can be connected to a same storage device 209 via interconnect 207, which can include one or more serial connections, a computer network, one or more network communication switches, etc.

Each of the servers 371, . . . , and 373 can have a host system 120 illustrated in FIG. 1 and/or a memory module 205 illustrated in FIG. 2. A data orchestrator 113 of a server 371, . . . , or 373 can tag data access requests (e.g., 321, 331, . . . , 341; or 351) with information indicative of the context of the data involved in the data access requests.

For example, data items used in different virtual machines 381, . . . , 383 (or 391, . . . , 393) can be tagged to indicate that the data items are used in different contexts.

For example, data items used in applications 385, . . . , 387 (or 395, . . . , 397) can be tagged to indicate that the data items are used in different contexts.

Further, communications from different servers 371, . . . , 373 can be identified as different contexts.

The controller 229 of the storage device 209 can place data of different active contexts in different memory regions 361, 363, . . . , 365 to reduce interference.

For example, data used by different servers 371, . . . , and 373 can be placed in different memory regions 363, . . . , and 365.

For example, data used by different virtual machines 381, . . . , 383 in a same server 371 can be placed in different memory regions 363, . . . , 365.

For example, data used by different applications 385, . . . , 387 running in a same virtual machine 381 can be placed in different memory regions 363, . . . , 365.

The controller 229 of the storage device 209 can dynamically identify the active contexts of data that is being used in a past time period and/or predicted to be used in the next time period and adjust data placements in the memory regions 361, 363, . . . , 365 to separate data of different contexts.

Figure 6:
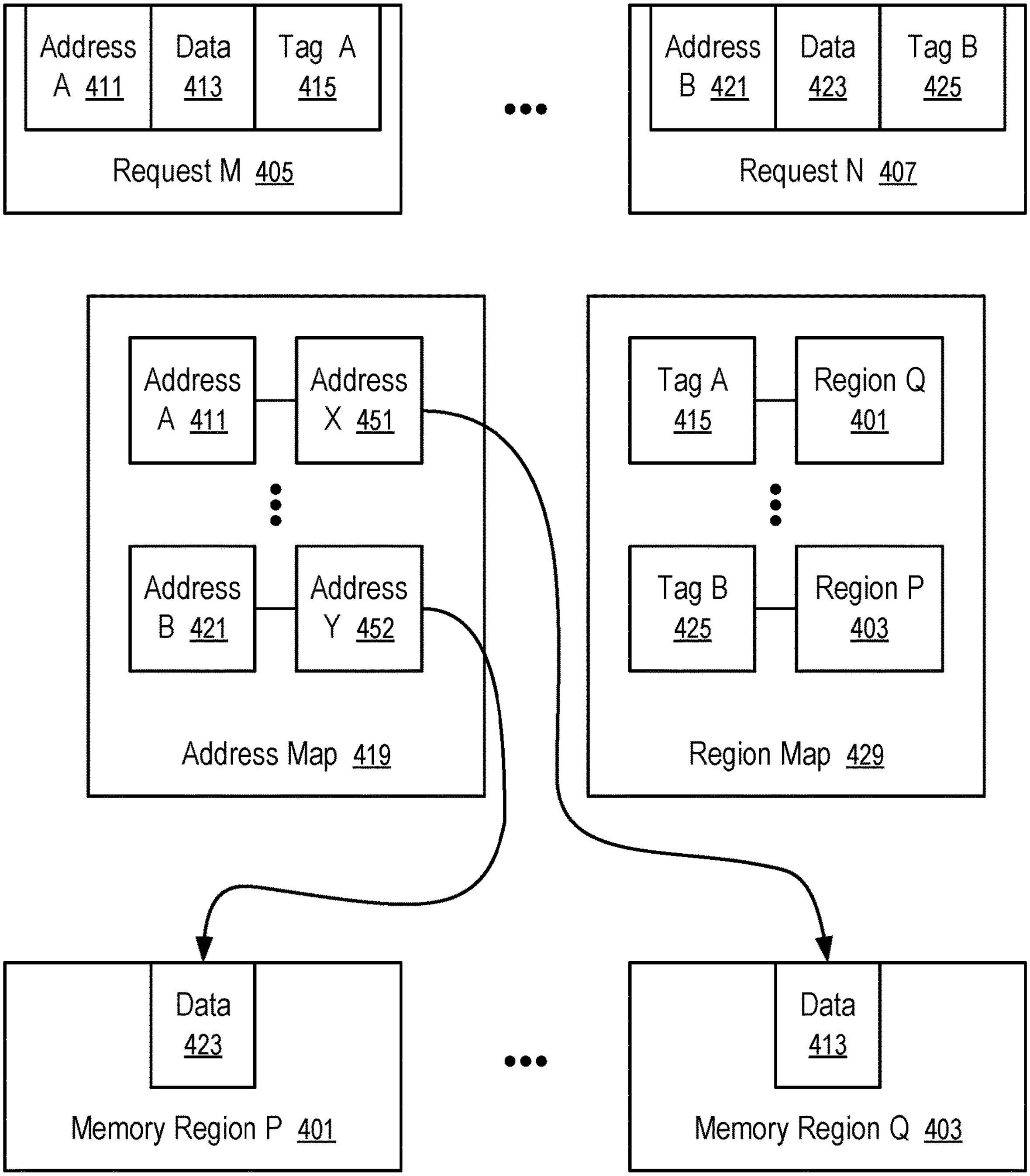
FIG. 6 illustrates tags configured in data access requests to assist data placement segregation into separate physical memory regions.

The data orchestrator 113 of a server 371, . . . , or 373 can tag data access requests in a way illustrated in FIG. 6

FIG. 6 illustrates tags configured in data access requests to assist data placement segregation into separate physical memory regions.

Different data access requests 405, . . . , 407 can specify the addresses 411, . . . , 421 of the data 413, . . . , 423. When a data access request is for a read operation, the data involved may not be provided in the request; and a response to the request can include the data.

Data access requests 405, . . . , 407 can include tags 415, . . . , 425. Different tags can be used to represent different contexts. A context can be determined from a combination of the identity of a server 371, the identity of a virtual machine 381 in the server 371, the identity of an application running the virtual machine, and/or an identity of a user running the application to access the data.

The controller 229 of the storage device 209 can manage an address map 419 that translates the addresses 411, . . . , 421 as used in the requests 405, . . . , 407 into physical addresses 451, . . . , 452 of the memory locations of the data 413, . . . , 423.

Further, the controller 229 maintains a region map 429 that assigns different active tags to different memory regions 401, . . . , 403. The controller 229 determines and/or adjusts the address map 419 such that data 423, . . . , 413 of different active contexts, as represented by the different tags 415, . . . , 425, is grouped into different memory regions 401, . . . , 403 for separation from each other.

A conventional memory system can have a cache structure where slower memories are accessed through faster memories. When a processor accesses data that is currently in a slower memory, the data is loaded to a faster memory as a proxy of the data in the slower memory. Subsequently, the processor operates on the proxy/cache of the data in the faster memory for improved performance. The faster memory typically has a capacity smaller than the slower memory. Thus, only a portion of the data in the slower memory can be cached concurrently in the faster memory. A cache miss occurs when an item accessed by the processor is not currently in the faster memory. A cache hit occurs when an item accessed by the processor is currently in the faster memory. The percentage of accesses that result in cache hits is a cache hit ratio. Improving the cache hit ratio can improve the operating performance of the computing system. However, it is a challenge to design a cache policy to improve cache hit ratio.

At least some aspects of the present disclosure address the above and other deficiencies by performing predictive data movements across different tiers of memories using a machine learning technique. Memories of different tiers can have different data access speeds. For example, to improve operating performance of a computing system, frequently used data can be placed in a faster memory; and less frequently used data can be placed in a slower memory. The faster memory can be optionally configured as a cache memory for the slower memory. In some instances, at least a portion of the slower memory can be accessed directly without going through the faster memory as a cache. Data usage information can be applied in a predictive model, trained using a machine learning technique, to predict workload intend and thus data movements across the memories of different tiers. For example, data usage information can include the history of data accesses and attributes related to data accesses, such as applications or programs that uses the data, user accounts in which the data accesses are made, virtual machines that access the data, objects to which the data belong, mapping between data blocks to objects as organized in applications, relations among objects, etc. The data movements predicted according to the data usage information can be performed preemptively to improve the operating performance of the computing system. The prediction model can be initially trained offline using historic data usage information and historic data movements caused by data accesses associated with the data usage information. The training minimizes the differences between the historic data movements and predictions generated by applying the historic data usage information in the prediction model. Subsequently, the prediction model can be used for real time prediction using the real time data usage information. Performing the predicted data movements can reduce the need to move data in response to data access requests. The data movements caused by the real time data access requests, and/or indications of whether the predicted data movements reduce the need to move data across the tires, can be used to identify desired real time prediction results. The desired results can further train the prediction model using a reinforcement machine learning technique for continued improvement and adaptation of the prediction model. The prediction model can be dynamically adapted to the current workloads in real time usage of the computing system.

Figure 7:
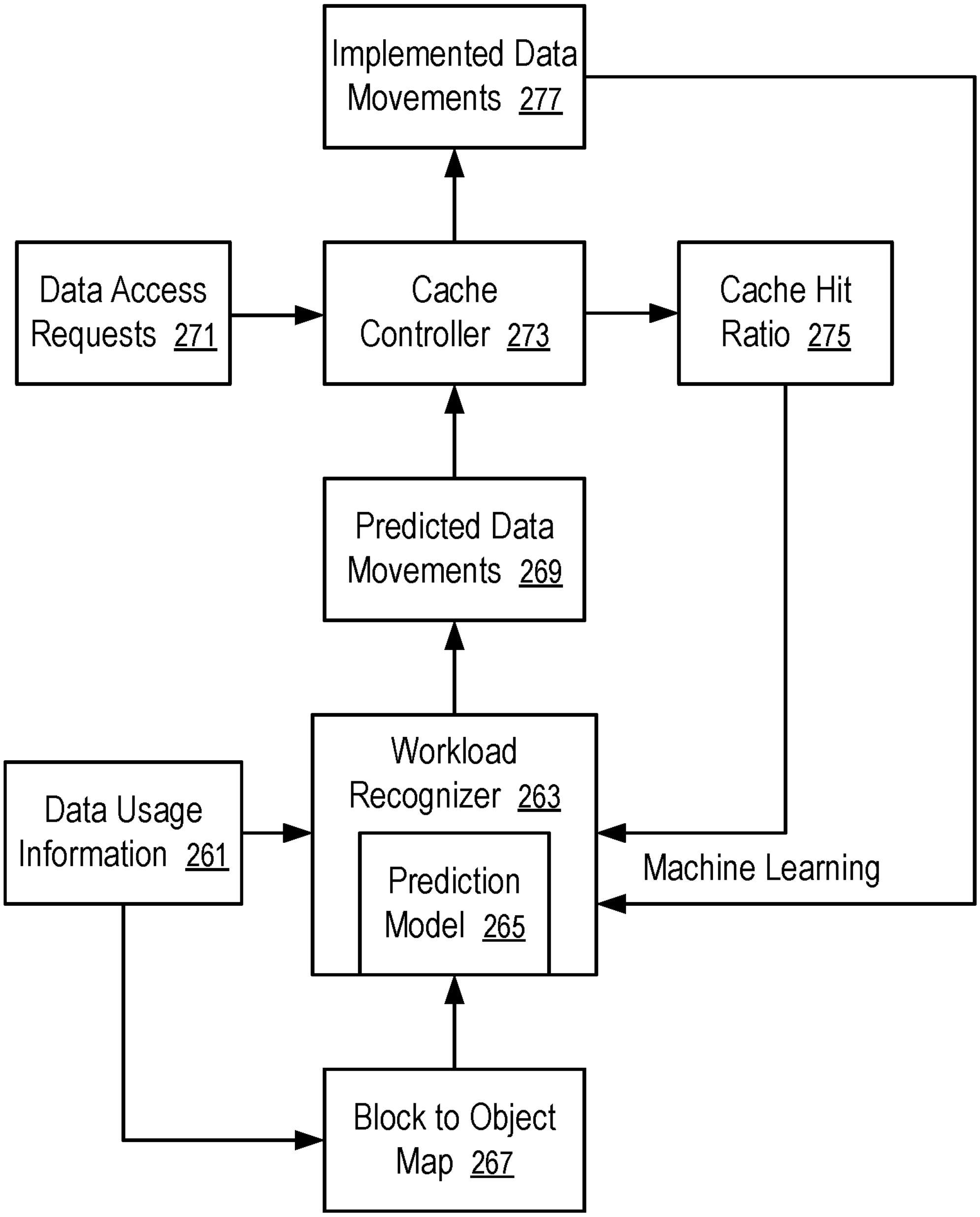
FIG. 7 illustrates an implementation of a data orchestrator.

FIG. 7 illustrates an implementation of a data orchestrator 113.

In FIG. 7, the data orchestrator 113 includes a cache controller 273 and a workload recognizer 263. The workload recognizer 263 includes a prediction model 265 that can be implemented using an artificial neural network.

The cache controller 273 processes data access requests 271 from the host system 120. The cache controller 273 monitors a higher performance memory used as a cache relative to a lower performance memory, analyzes the usage of the cache, optimizes the usage of the cache, and manages the use of the cache. Conventional cache techniques can be implemented in the cache controller 273.

In response to the data access requests 271, the cache controller 273 determines whether the data targeted by the requests 271 are in the higher performance memory at the time of the requests 271. If so, the cache controller 273 counts the corresponding data access requests 271 as cache hits; and otherwise, the cache controller 273 counts the corresponding data access requests 271 as cache misses. Thus, the cache controller 273 can generate the measurement of cache hit ratio 275 for the data distribution at the time of the data access requests 271.

Optionally, the cache controller 273 may service a portion of data access requests 271 directly from the lower performance memory without caching/loading the corresponding data into the higher performance memory.

The cache policy used by the cache controller 273 can be used to identify data movements 277 that are implemented by the cache controller 273.

The data usage information 261 corresponding to the data access requests 271 is collected for an initial time period of the operation of the computing system for the training of the prediction model 265. For example, a supervised machine learning technique can be used to train the artificial neural network of the prediction model 265 to minimize the different between the data movements 277 implemented by the cache controller 273 responsive to the data access requests 271 and the data movement 269 predicted using the prediction model 265 using the data usage information 261 corresponding to the data access requests 271. The machine learning can be performed offline on another computing device to establish the initial prediction model 265.

Subsequently, the prediction model 265 can be used in the workload recognizer 263 to make real time predictions of data movements 269 based on real time data usage information 261 and real time data access requests 271. The workload recognizer 263 instructs the cache controller 273 to perform the predicted data measurements, which can cause changes in the cache hit ratio 275. The prediction model 265 is adjusted and/or trained in real time using a hybrid reinforcement machine learning technique to continuously drive up the cache hit ratio 275. Thus, the prediction model 265 can automatically adapt to the current workload of the computing system and implement predicted data movements 269 to achieve a cache hit ratio 275 higher than that can be achieved via the cache controller 273 alone.

Preferably, the predictions made by the workload recognizer 263 are based at least in part on a block to object map 267. For a statistical analysis of the data usage information 261, the data orchestrator 113 can identify the underlying relations among data blocks. For example, some data blocks represent parts of a same data object in an application; parts of a data object are accessed together; some data objects have a pattern of being accessed in a particular order; the access to one data object in a user account running an application on a virtual machine can have a high probability of leading to the access to another data object. The block to object map 267 identifies the relations that improve the prediction accuracy of the workload recognizer 263.

Figure 8:
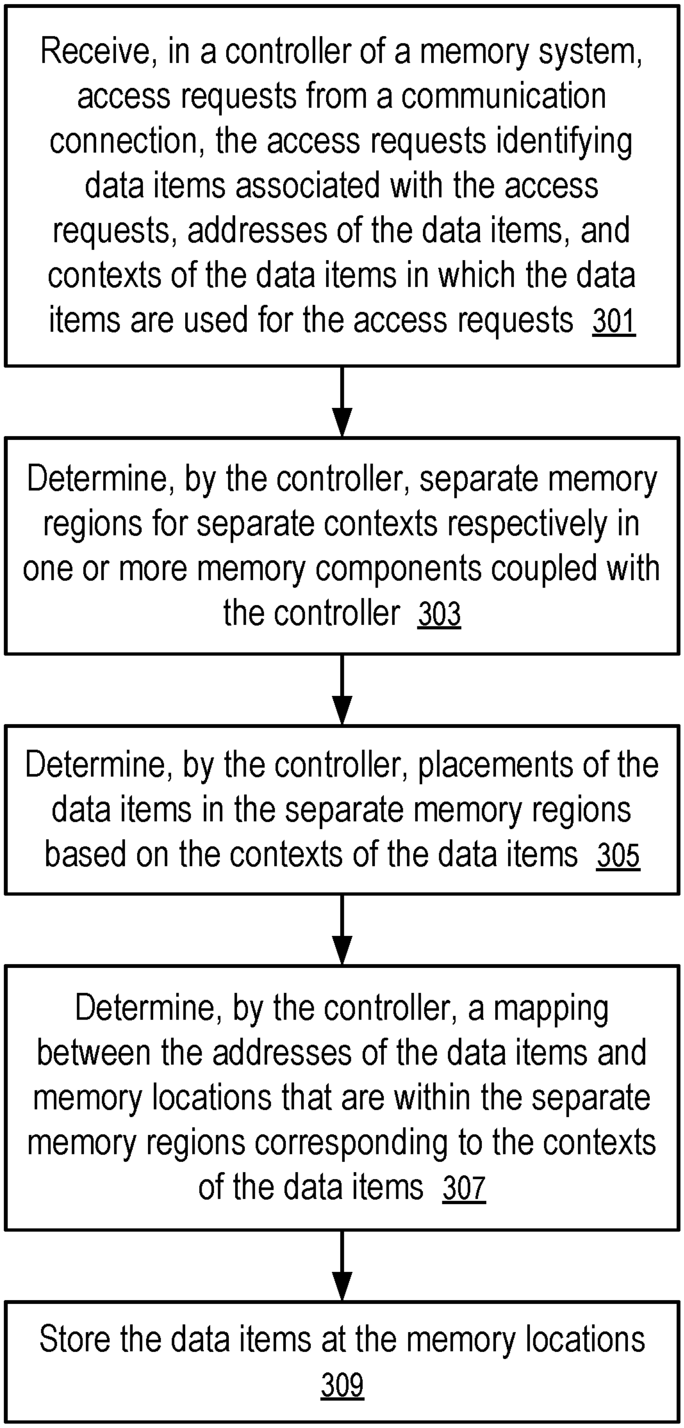
FIG. 8 shows a method of data grouping in separate physical memory regions according to data usage contexts.

FIG. 8 shows a method of data grouping in separate physical memory regions according to data usage contexts. The method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 is performed at least in part by and/or in connection with, the controller 229 of a storage device 209 of FIG. 2, 4, or 5, and/or the data orchestrator 113 of FIG. 1, 2, 4, or 7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 8 can be implemented in a computing system of FIG. 1 or 2 with a host operating system 241 of FIG. 4 and a prediction model 265 of FIG. 7. For example, the data orchestrator 113 can be implemented at least in part via the cache controller 273 and the workload recognizer 263 of FIG. 7 and/or the virtual function 247 of FIG. 4.

At block 301, a controller 229 of a memory system 110 receives access requests 405, . . . , 407 from a communication connection 207. The access requests 405, . . . , 407 identifying data items 413, . . . , 423, associated with the access requests 405, . . . , 407, addresses 411, . . . , 421 of the data items 413, . . . , 423, and contexts of the data items 413, . . . , 423 in which the data items 413, . . . , 423 are used for the access requests 405, . . . , 407.

For example, the contexts can be represented by tags 415, . . . , 425 that are separate from the addresses 411, . . . , 421 of the requests 405, . . . , 407.

For example, the communication connection 207 can be connected to different servers 371, . . . , 373 or host systems; and data items 413, . . . , 423 used in the different servers 371, . . . , 373 can be assigned to have different contexts.

For example, the access requests 405, . . . , 407 can be received via the communication connection 207 from different virtual machines 381, . . . , 383 configured in a same host system 371 or 120; and data items 413, . . . , 423 used in the different virtual machines 381, . . . , 383 can be assigned to have different contexts.

For example, the access requests 405, . . . , 407 can be received via the communication connection 207 from different applications 385, . . . , 387 running in a same virtual machine (e.g., 381, . . . , or 383); and data items 413, . . . , 423 used in the different applications 385, . . . , 387 can be assigned to have different contexts.

At block 303, the controller 229 determines separate memory regions 401, . . . , 403 for separate contexts respectively in one or more memory components 109A, . . . , 109N coupled with the controller 229.

For example, the one or more memory components 109A, . . . , 109N can include flash memory; and the separate memory regions 401, . . . , 403 can be partitioned such that they do not share or occupy a common block of flash memory.

For example, the one or more memory components 109A, . . . , 109N can include multiple integrated circuit memory devices; and the separate memory regions 401, . . . , 403 can be partitioned such that they do not share any of the integrated circuit memory devices. For example, each of the integrated circuit memory devices can have an embedded controller disposed within a respective integrated circuit package. The embedded controller can receive access requests from the controller 229 via a serial communication connection (e.g., SATA, PCIe, USB).

At block 305, the controller 229 determines placements of the data items 413, . . . , 423 in the separate memory regions 401, . . . , 403 based on the contexts of the data items 413, . . . , 423.

For example, the controller 229 can have a region map 429 that assign each context represented by a tag 415 with a corresponding region 401, such that the data of the context is grouped and placed within the memory region 401.

At block 307, the controller 229 can determine a mapping between the addresses 411, . . . , 421 of the data items 413, . . . , 423 as known outside of the memory sub-system 110 (e.g., the storage device 209) and memory locations (e.g., physical addresses 451, . . . , 452) that are within the separate memory regions 401, . . . , 403 corresponding to the contexts of the data items 413, . . . , 423.

For example, the controller 229 can have an address map 419 that translates the addresses 411, . . . , 421 known outside of the storage device 209 for the data items 413, . . . , 423 into the physical addresses 451, . . . , 452 used inside of the storage device 209 to access the memory locations of the data items 413, . . . , 423.

At block 309, the controller 229 stores the data items 413, . . . , 423 at the memory locations.

Optionally, the controller 229 can adjust data placements based on identification of active contexts in a time period.

For example, the active contexts can be determined based at least in part on identifications of host systems in which the access requests 405, . . . , 407 are generated, identifications of virtual machines in which the access requests 405, . . . , 407 are generated, identifications of applications in which the access requests 405, . . . , 407 are generated, or identifications of user accounts in which the access requests 405, . . . , 407 are generated, or any combination thereof.

The active contexts can be identified based at least in part on read requests. For example, data of inactive contexts can be allowed to be mixed in a memory region; and data of active contexts can be relocated such that different active contexts are mapped to separate memory regions 401, . . . , 403.

For example, the controller 229 can extract tags 415, . . . , 425 from the access requests 405, . . . , 407, where the tags 415, . . . , 425 are separate from the addresses. The controller 229 can identify the contexts of the data items 413, . . . , 423 associated with the requests 405, . . . , 407 based on the tags 415, . . . , 425.

The tags 415, . . . , 425 can be generated and/or added by a data orchestrator 113.

For example, the data orchestrator 113 can receive (e.g., from a host system 120) first access requests 321, 331, . . . , 341 and information identifying the contexts of the first access requests 321, 331, . . . , 341. The data orchestrator 113 can generate different tags 415, . . . , 425 to represent different contexts. The data orchestrator 113 can generate second access requests (e.g., 351) in accordance with the first access request (e.g., 321, 331, . . . , 341) and transmit the second access requests (e.g., 351) to the one or more memory components 109A, . . . , 109N. The second access requests (e.g., 351) can be generated to include different tags (e.g., 415, . . . , 425) representing the different contexts.

For example, the data orchestrator 113 can be configured to combine a subset of the first access requests (e.g., 321, 331, . . . , 341) as a single access request (e.g., 351) transmitted to a memory component (e.g., 109A or 109N) through a serial connection and/or a computer network. In some instances, the requests 321, 331, . . . , 341 being combined can be of a same type, such as read requests, write requests, or erasure requests; and the combination 350 reduces communication protocol overhead.

Optionally, when the data orchestrator 113 receives a response to the combined request 351, it uses the response to generate separate responses for the original requests 321, 331, . . . , 341 respectively.

For example, the combined request 351 can be constructed and/or transmitted in accordance with a standard for serial advanced technology attachment (SATA), peripheral component interconnect express (PCIe), or universal serial bus (USB).

In some implementations, a communication channel between the processing device 118 and a memory sub-system includes a computer network, such as a local area network, a wireless local area network, a wireless personal area network, a cellular communications network, a broadband high-speed always-connected wireless communication connection (e.g., a current or future generation of mobile network link); and the processing device 118 and the memory sub-system can be configured to communicate with each other using data storage management and usage commands similar to those in NVMe protocol.

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular layers of wires, where one layer is above the memory element columns and the other layer below the memory element columns. Each memory element can be individually selected at a cross point of one wire on each of the two layers. Cross point memory devices are fast and non-volatile and can be used as a unified memory pool for processing and storage.

The controller (e.g., 227, or 229) of a memory sub-system (e.g., 205 or 209) can run firmware to perform operations responsive to the communications from the processing device 118. Firmware in general is a type of computer program that provides control, monitoring and data manipulation of engineered computing devices.

Some embodiments involving the operation of the controller 227 can be implemented using computer instructions executed by the controller 227, such as the firmware of the controller 227. In some instances, hardware circuits can be used to implement at least some of the functions. The firmware can be initially stored in the non-volatile storage media, or another non-volatile device, and loaded into the volatile DRAM and/or the in-processor cache memory for execution by the controller 227.

A non-transitory computer storage medium can be used to store instructions of the firmware of a memory sub-system (e.g., 209 or 205) and/or the instructions of the operating system (e.g., 241, 243) in general and the device driver and the hypervisor 245 in particular. When the instructions are executed by the controller 227 and/or the processing device 118, the instructions cause the controller 227 and/or the processing device 118 to perform a method discussed above.

Figure 9:
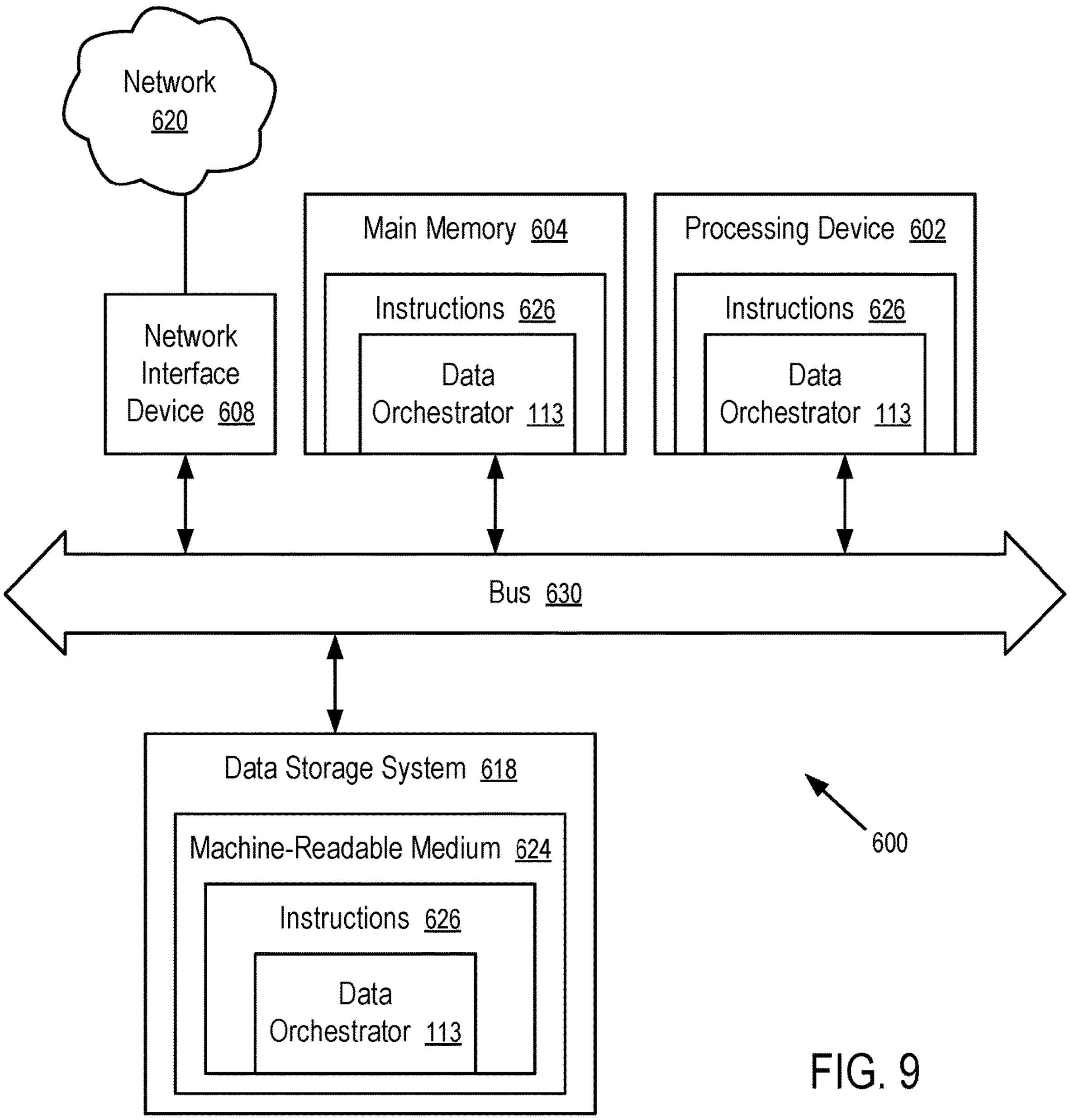
FIG. 9 is a block diagram of an example computer system in which embodiments of the present disclosure can operate.

FIG. 9 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a data orchestrator 113 (e.g., to execute instructions to perform operations corresponding to the data orchestrator 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data orchestrator 113 (e.g., the data orchestrator 113 described with reference to FIGS. 1-8). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system, comprising:

one or more memory components; and a processing device, operatively coupled with the one or more memory components, to at least:

receive, from a host system, first access requests;

receive, from the host system, information identifying contexts of the first access requests;

generate second access requests in accordance with the first access requests and the contexts; and transmit the second access requests to the one or more memory components in response to the first access requests.

2. The memory system of claim 1, wherein the second access requests are configured to identify the contexts of the first access requests.

3. The memory system of claim 1, wherein the second access requests are transmitted via one or more serial connection to the one or more memory components respectively.

4. The memory system of claim 1, wherein the processing device is further configured to combine a subset of the first access requests as a single access request transmitted to a memory component.

5. The memory system of claim 4, wherein the subset of the first access requests includes read requests.

6. The memory system of claim 4, wherein the subset of the first access requests includes requests of a same type.

7. The memory system of claim 4, wherein the processing device is further configured to receive a response to the single access request and generate a plurality of responses for the subset of the first access requests respectively from the response to the single access request.

8. The memory system of claim 3, wherein the second access requests in accordance with a standard for serial advanced technology attachment (SATA), peripheral component interconnect express (PCIe), or universal serial bus (USB).

9. A method comprising:

receiving, via a processing device operatively coupled with one or more memory components, first access requests from a host system;

receiving, via the processing device, information identifying contexts of the first access requests from the host system;

generating, via the processing device, second access requests in accordance with the first access requests and the contexts; and transmitting, via the processing device, the second access requests to the one or more memory components in response to the first access requests.

10. The method of claim 9, further comprising:

generating, via the processing device, different tags to represent different contexts; and wherein the second access requests include the different tags representing the contexts of the first access requests.

11. The method of claim 9, wherein the second access requests are transmitted via one or more serial connection to the one or more memory components respectively.

12. The method of claim 9, further comprising:

combining, via the processing device, a subset of the first access requests as a single access request transmitted to a memory component.

13. The method of claim 12, wherein the subset of the first access requests includes read requests.

14. The method of claim 12, wherein the subset of the first access requests includes requests of a same type.

15. The method of claim 12, further comprising:

receiving, via the processing device, a response to the single access request and generate a plurality of responses for the subset of the first access requests respectively from the response to the single access request.

16. The method of claim 11, wherein the second access requests in accordance with a standard for serial advanced technology attachment (SATA), peripheral component interconnect express (PCIe), or universal serial bus (USB).

17. A non-transitory computer readable medium having stored thereon a set of instructions, which when executed cause a processing device to perform a method comprising:

receiving, via the processing device operatively coupled with one or more memory components, first access requests from a host system;

receiving, via the processing device, information identifying contexts of the first access requests from the host system;

generating, via the processing device, second access requests in accordance with the first access requests and the contexts; and transmitting, via the processing device, the second access requests to the one or more memory components in response to the first access requests.

18. The non-transitory computer readable medium of claim 17, wherein the method further comprises:

generating, via the processing device, different tags to represent different contexts; and wherein the second access requests include the different tags representing the contexts of the first access requests.

19. The non-transitory computer readable medium of claim 17, wherein the second access requests are transmitted via one or more serial connection to the one or more memory components respectively.

20. The non-transitory computer readable medium of claim 17, wherein the method further comprises:

combining, via the processing device, a subset of the first access requests as a single access request transmitted to a memory component.

* * * * *